United States Patent
Joseph

(10) Patent No.: US 9,100,214 B1
(45) Date of Patent: Aug. 4, 2015

(54) PERFORMING CUSTOMER BANDWIDTH PROFILING IN COMPUTER NETWORKS

(75) Inventor: Vinod Joseph, Egham (GB)

(73) Assignee: Juniper Networks, Inc., Sunnyvale, CA (US)

( * ) Notice: Subject to any disclaimer, the term of this patent is extended or adjusted under 35 U.S.C. 154(b) by 943 days.

(21) Appl. No.: 13/171,142

(22) Filed: Jun. 28, 2011

(51) Int. Cl.
G06F 7/04 (2006.01)
G06F 15/16 (2006.01)
G06F 17/30 (2006.01)
H04L 29/06 (2006.01)
H04L 12/46 (2006.01)

(52) U.S. Cl.
CPC ........ H04L 12/4641 (2013.01); H04L 12/4658 (2013.01)

(58) Field of Classification Search
CPC ............ H04L 12/4641; H04L 12/4658; H04L 12/465; H04L 49/354; H04L 12/4654
USPC .............................................................. 726/3
See application file for complete search history.

(56) References Cited

U.S. PATENT DOCUMENTS

| | | | | |
|---|---|---|---|---|
| 6,765,881 B1 * | 7/2004 | Rajakarunanayake | ........ | 370/256 |
| 6,839,348 B2 * | 1/2005 | Tang et al. | ........................ | 370/390 |
| 6,874,090 B2 * | 3/2005 | See et al. | ............................. | 726/13 |
| 7,619,966 B2 * | 11/2009 | Lee | .................................. | 370/218 |
| 7,630,386 B2 * | 12/2009 | Platnic | ............................. | 370/401 |
| 7,817,553 B2 * | 10/2010 | Parandekar | ...................... | 370/235 |
| 7,869,450 B2 * | 1/2011 | DelRegno et al. | ............... | 370/409 |
| 8,194,674 B1 * | 6/2012 | Pagel et al. | ...................... | 370/393 |
| 8,549,178 B2 * | 10/2013 | Sultan et al. | .................... | 709/249 |
| 2002/0199104 A1 * | 12/2002 | Kakemizu et al. | .............. | 713/168 |
| 2006/0007939 A1 * | 1/2006 | Elangovan | ................. | 370/395.53 |
| 2009/0141703 A1 * | 6/2009 | Ghodrat et al. | ................. | 370/352 |

OTHER PUBLICATIONS

Rigney et al. "Remote Authentication Dial in User Service (RADIUS)", RFC 2865, Network Working Group, The Internet Society, Jun. 2000, p. 1-77.

* cited by examiner

*Primary Examiner* — Arvin Eskandarnia
(74) *Attorney, Agent, or Firm* — Shumaker & Sieffert, P.A.

(57) ABSTRACT

In general, techniques are described for performing customer bandwidth profiling in computer networks. A network device intermediately positioned in a service provider network between a customer network and a centralized network device that provides a hierarchical arrangement of virtual local area networks (VLANs) located in the service provider network may perform the techniques. The network device determines a service profile based on authentication messages and associates the service profile with the hierarchical arrangement of VLANs used for delivering the traffic to and from the customer network and the service provider network. The service profile defines constraints on delivery of the traffic associated with the one or more services. The network device then applies the service profile to the traffic received via the associated hierarchical arrangement of VLANs to enforce the constraints on the delivery of the traffic received via the associated hierarchical arrangement of VLANs.

34 Claims, 7 Drawing Sheets

US 9,100,214 B1

PERFORMING CUSTOMER BANDWIDTH PROFILING IN COMPUTER NETWORKS

TECHNICAL FIELD

The invention relates to computer networks and, more particularly, to profiling customer bandwidth within computer networks.

BACKGROUND

Service providers generally own and operate a packet-switched network to provide one or more services to customers in accordance with a service profile. The service profile may define minimum bandwidth rates and maximum bandwidth rates for each of the various services to which the customer has subscribed. The service profile may also define latency limits for each of the different services to which the customer has subscribed and any other limits on various characteristics associated with providing the subscribed-to services.

Recently, service providers have begun to offer what are referred to as "multi-play services" to customers over a packet-switched network, where, for example, a service provider may offer a triple-play service to customers that includes a data or Internet service, a telephone service in the form of Voice over Internet Protocol (VoIP) service, and a television service (which is sometimes provided in the form of an Internet Protocol Television (IPTV) service).

To enforce the service profiles for each of the customers, the service providers may deploy one or more network devices, such as a broadband network gateway (BNG). The BNG may terminate a customer connection with the service provider network and provide a single point of contact with regard to the customer session such that profiling, management and customer policy enforcement may be possible. BNGs may be deployed in either a distributed or centralized manner. When distributed, the BNGs may be placed toward the edge of the service provider network. This more proximate location of the BNGs may facilitate bandwidth profiling across the various services and provide for better management of customer traffic, particularly, when this traffic is multicast to the customer's network. Multicast traffic is becoming increasingly more common considering that more service providers are beginning to deliver television services via an IPTV service rather than as a dedicated service separate from data services. However, decentralized or distributed BNGs are difficult to administer considering that the BNGs may be distant from one another rather than centrally located. Moreover, in this decentralized deployments, the service provider may require more BNGs than in centralized deployments considering that BNGs may be deployed in less populated areas that may not fully utilize the BNG, therefore wasting capacity that may otherwise have been used in a centralized deployment. Requiring more BNGs may increase costs, leading many service providers to opt for a centralized BNG deployment.

In this centralized BNG deployment, the BNGs are located in a central office and are logically connected to each customer network via one or more customer virtual local area networks (C-VLANs) or one or more C-VLANs and one or more multicast-VLANs (M-VLANs). While the centralized BNG deployment models may reduce costs, these centralized models may suffer from difficulties in accurately monitoring and profiling bandwidth with respect to each customer network. Moreover, in the centralized BNG model involving only C-VLANs, bandwidth may not be utilized efficiently as multicast traffic, such as IPTV traffic, is replicated for each C-VLAN at the centralized BNG rather than further downstream, as would be the case in centralized BNG deployments that utilize M-VLANs in addition to C-VLANs to connect with customer networks. As a result of not being able to accurately profile customer bandwidth utilization, service providers may not be able to police or otherwise enforce the service profile in the centralized BNG models with the result that customers may either receive more or less bandwidth than that provided for in their associated service profile.

SUMMARY

In general, techniques are provided for performing customer profiling in computer networks having centralized deployments of network devices, such as broadband network gateways (BNGs), that terminate and manage customer connections. The techniques may adapt one or more network devices intermediately positioned between the customer networks and these centralized network devices to profile customer network bandwidth and apply the service profile. Because the intermediately positioned network device is generally positioned in the network prior to aggregation of customer traffic, the intermediately positioned network device may identify to which customer network data traffic is associated unlike the centralized network devices that terminate and manage these connections, where upstream aggregation may prevent accurate bandwidth profiling. Consequently, the techniques may enable service providers to achieve the cost benefits associated with a centralized deployment of customer connection management devices while also potentially providing for the more accurate customer bandwidth profiling (and thereby policing and enforcement of the service profile) of de-centralized or distributed deployments of customer connection management devices.

In one embodiment, a method comprises determining a service profile based on authentication messages with a network device intermediately positioned in a service provider network between a customer network and a centralized network device that provides a hierarchical arrangement of virtual local area networks (VLANs) over which traffic to and from the customer network for one or more services is delivered, wherein the hierarchical arrangement of VLANs includes a first VLAN that is tunneled through a second VLAN. The method also comprises associating, with the intermediately positioned network device, the service profile with the hierarchical arrangement of VLANs used for delivering the traffic to and from the customer network and the service provider network, wherein the service profile defines constraints on delivery of the traffic associated with the one or more services sent to and received by the customer network and applying the service profile with the intermediately positioned network device to the traffic received via the associated hierarchical arrangement of VLANs to enforce the constraints on the delivery of the traffic received via the associated hierarchical arrangement of VLANs.

In another embodiment, a network device intermediately positioned in a service provider network between a customer network and a centralized network device that provides a hierarchical arrangement of virtual local area networks (VLANs) over which traffic to and from the customer network for one or more services is delivered, the network device comprises a control unit that determines a service profile based on authentication messages, wherein the hierarchical arrangement of VLANs includes a first VLAN that is tunneled through a second VLAN, and associates the service profile with the hierarchical arrangement of VLANs used for delivering the traffic to and from the customer network and the service provider network, wherein the service profile defines constraints on delivery of the traffic associated with the one or more services sent to and received by the customer network. The network device also comprises at least one interface card that applies the service profile with the intermediately positioned network device to the traffic received via the associated hierarchical arrangement of VLANs to enforce the constraints on the delivery of the traffic received via the associated hierarchical arrangement of VLANs.

In another embodiment, a non-transitory computer-readable medium comprising instructions that, when executed, cause one or more processors of a network device intermediately positioned in a service provider network between a customer network and a centralized network device that provides a hierarchical arrangement of virtual local area networks (VLANs) in the service provider network to determine a service profile based on authentication messages, wherein the hierarchical arrangement of VLANs includes a first VLAN that is tunneled through a second VLAN, associate the service profile with the hierarchical arrangement of VLANs used for delivering the traffic to and from the customer network and the service provider network, wherein the service profile defines constraints on delivery of the traffic associated with the one or more services sent to and received by the customer network and apply the service profile with the intermediately positioned network device to the traffic received via the associated hierarchical arrangement of VLANs to enforce the constraints on the delivery of the traffic received via the associated hierarchical arrangement of VLANs.

In another embodiment, a network system comprises a customer network and a service provider network. The service provider network includes a centralized network device that manages customer network connections and a network device intermediately positioned between the customer network and the centralized network device. The intermediately positioned network device comprises a control unit that determines a service profile based on authentication messages, wherein the hierarchical arrangement of VLANs includes a first VLAN that is tunneled through a second VLAN and associates the service profile with the hierarchical arrangement of VLANs used for delivering the traffic to and from the customer network and the service provider network, wherein the service profile defines constraints on delivery of the traffic associated with the one or more services sent to and received by the customer network and at least one interface card that applies the service profile with the intermediately positioned network device to the traffic received via the associated hierarchical arrangement of VLANs to enforce the constraints on the delivery of the traffic received via the associated hierarchical arrangement of VLANs.

The details of one or more embodiments of the techniques are set forth in the accompanying drawings and the description below. Other features, objects, and advantages of the techniques will be apparent from the description and drawings, and from the claims.

DETAILED DESCRIPTION

Figure 1:
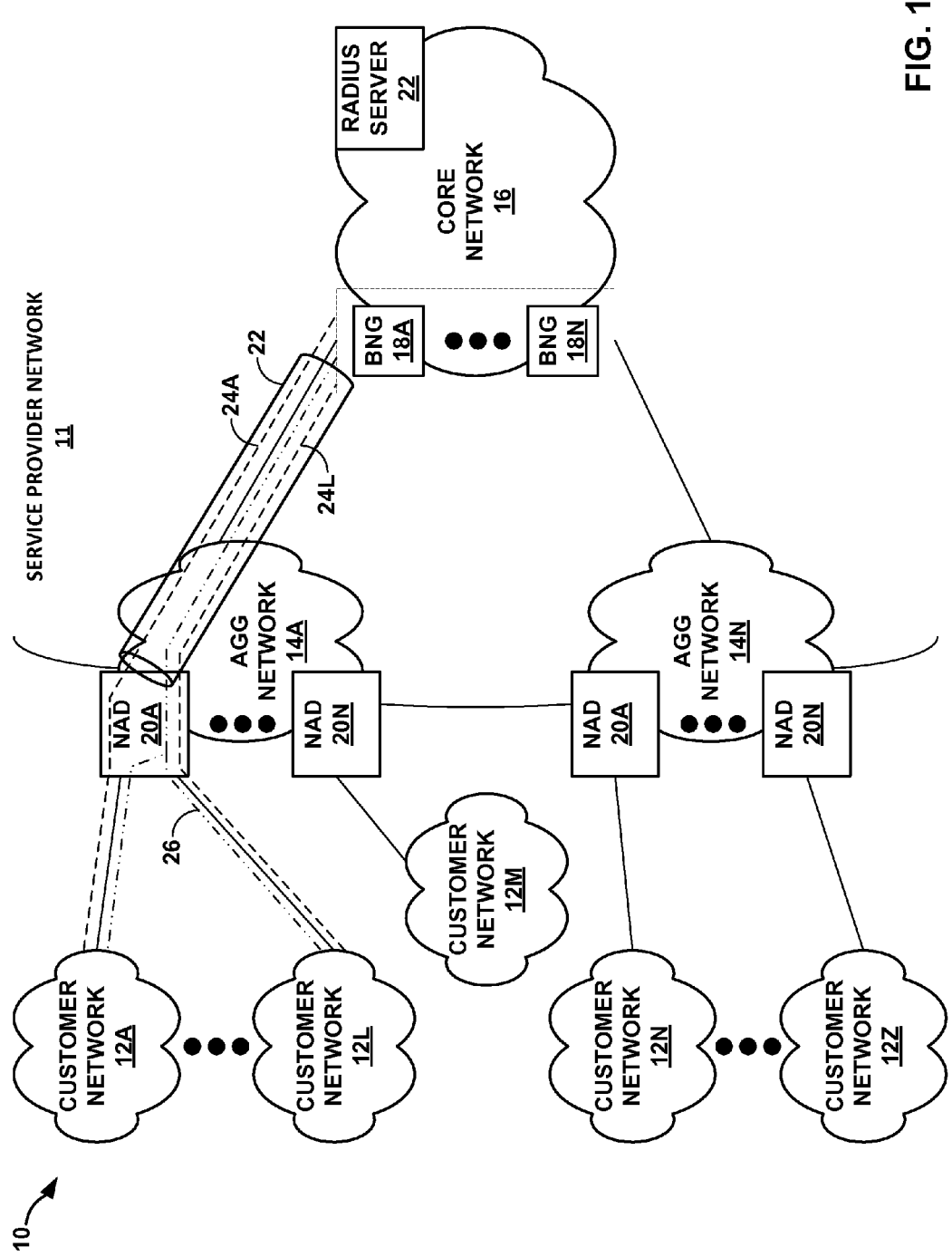
FIG. 1 is a block diagram illustrating an exemplary network system that implements the customer bandwidth profiling techniques described in this disclosure.

FIG. 1 is a block diagram illustrating an exemplary network system 10 that implements the customer bandwidth profiling techniques described in this disclosure. In the example of FIG. 1, network system 10 includes a service provider network 11 and customer networks 12A-12Z ("customer networks 12"). Service provider network 11 represents a network that provides one or more services to which customers may subscriber. Service provider network 11 may provide a number of different services, including a telephone service provided either by way of a plain old telephone system (POTS) network or a voice over Internet Protocol (VoIP) service by way of a layer three (L3) or packet-switched network, a television service provided by way of a dedicated coaxial cable network or as a streaming Internet Protocol television (IPTV) service over a L3 packet-switched network and/or a data or Internet service. Reference to layers followed by a number in this disclosure refers to corresponding layers of an Open Systems Interconnection (OSI) model.

Customer networks 12 each represents a network owned and operated by a customer or subscriber that subscribes to one or more services provided by service provider network 11. Customer networks 12 are often L2 (which is also known as the data-link layer of the OSI model) networks that switch rather than route packets within customer networks 12. Although not shown in the example of FIG. 1 for ease of illustration purposes, customer networks 12 may include one or more computers, laptops, cellular phones (including so-called "smart phones"), tablet or slate computers, televisions (including so-called "smart TVs" capable of accessing various portions of a public network, such as the Internet), set-top boxes, personal gaming devices, personal media devices, telephones, switches, hubs, routers, wireless access points (WAPs), servers, or any other type of device generally available to customers that may access or otherwise interface with customer network 12. In addition, customer networks 12 may also include (although, again, not shown in the example of FIG. 1 for ease of illustration purposes) other network devices that may facilitate the transfer of data between these customer devices and/or service provider network 11, such as digital subscriber line (DSL) modems and cable modems, which may be generally referred to as "customer access devices."

When subscribing to one or more services provided by service provider network 11, the customer may contract with the service provider that owns and operates service provider network 11 so as to establish a certain level of service by which the service provider provides the subscribed-to services via service provider network 11. Often this level of service for the various services to which the customer has subscribed is referred to as a service profile. The service profile identifies constraints on the delivery of data for one or more of the services subscribed to by the customer. These constraints may include a minimum latency and/or maximum latency by which the service provider agrees to provide traffic corresponding to one or more services to which the customer has subscribed. The constraints may also include a minimum and maximum bandwidth the service provider agrees to provide within service provider network 11 to delivery traffic corresponding to the one or more services to which the customer has subscribed.

To provide these services in accordance with the customer's service profile, the service provider provisions service provider network 11 such that the traffic corresponding to the subscribed-to services are delivered in accordance with the service profile. The service provider may provision the network to deliver traffic in accordance with the service profile in a number of different ways that depend on a deployment model to which the service provider has deployed various network devices responsible for routing or otherwise facilitating the delivery of customer traffic within service provider network 11.

One model, which is not illustrated in the example of FIG. 1, involves a decentralized deployment of network devices responsible for terminating network connectivity between customer networks 12 and service provider network 11. An example of such a network device that is responsible for terminating network connectivity between customer networks 12 and service provider network 11 is referred to as a broadband network gateway (BNG). In this decentralized model, the service provider deploys the BNGs at the customer-facing edge of service provider network 11, which in the example of FIG. 1 is shown to include so-called aggregation (agg) networks 14A-14N ("aggregation networks 14"). Aggregation networks 14 represent networks proximate to customer networks 12 that facilitate access by customer networks 12 to service provider network 11.

Typically, service providers deploy aggregation networks 14 to, as the name suggests, aggregate upstream (that is, from customer networks 12 to service provider network 11) customer traffic for delivery to a centralized core network 16. Often, service providers refer to the aggregation and delivery of this customer traffic to a centralized core network as "backhauling" this traffic to core network 16. Core network 16 represents a network that provides core or centralized supporting services, such as authentication, administration and accounting (AAA) services, that support the services provided by service provider network 11 to customer networks 12. Core network 16 may also represent a core network in that it provides the centralized or core network through which a majority of customer traffic is routed to this traffic's various destinations. Core network 16 may comprise a network that implements L3 packet-routing to route this traffic to its destination.

Aggregation networks 14 may comprise a multiprotocol label switching (MPLS) network that implements one or more MPLS protocols, such as a label distribution protocol (LDP), a resource reservation protocol (RSVP), or various thereof (including traffic engineering versions of RSVP referred to as RSVP-TE). Aggregation networks 14 may backhaul upstream subscriber traffic by tunneling this traffic through a label switch path (LSP) configured using one of the MPLS protocols noted above. Each of the LSPs may further be logically segmented using so-called pseudowires (PW), which represent another logical connection that emulates a form of connectivity different from how the underlying aggregation networks 14 typically communicate traffic. That is, a PW may be established over routers of aggregation network 14 (which are not shown for ease of illustration purposes) that implement L3 packet routing so as to provide L2 form of connectivity, as one example. In this example, while these routers typically route packets, these routers may emulate a L2 form of switching to provide a L2 form of connectivity over a L3 packet-routing network.

Aggregation networks 14 may tunnel this upstream customer traffic by appending a label for both the LSP and the PW associated with the customer networks to the packets to form an MPLS packet. Aggregation networks 14 may then forward this packet with the associated LSP and PW label to core network 16. Aggregation network 14 may then switch this packet through the LSP based on the labels rather than on a destination address, such as an Internet protocol (IP) destination address specified in the header of the packets forming the customer traffic. LSPs may be unidirectional and established both in the upstream and downstream direction, each of these LSPs supporting one or more PWs and commonly a plurality of PWs. PWs are typically employed both for their emulation characteristics and as a way to reduce the number of LSPs. The LSPs and PWs are not shown in the example of FIG. 1 for ease of illustration purposes. While described in the context of LSPs and PWs, the techniques may be implemented regardless of whether aggregation networks 14 represent MPLS networks or not. Moreover, the techniques may be implemented regardless of whether PWs are employed to segment LSPs or not. Consequently, the techniques should not be limited in these respects to the example of FIG. 1.

Returning to the decentralized BNG deployment model, the service provider may deploy BNGs or similar types of network devices within aggregation networks 14 to terminate one or more customer connections between customer networks 12 and service provider network 11. BNGs may then monitor both upstream and downstream customer traffic received from and directed to those customer networks 12 that connect to service provider network 11 via one of aggregation networks 14. The BNGs may then configure one or more policers and/or traffic shapers that police or otherwise shape this customer traffic to enforce the service profile associated with each of customer networks 12.

In this manner, this more proximate location of the BNGs may facilitate bandwidth profiling across the various services and provide for better management of customer traffic, particularly, when traffic is multicast to the customer's network, which is becoming increasingly more common considering that more service providers are beginning to deliver television services via an IPTV service rather than as a dedicated service separate from data services. However, decentralized or distributed BNGs are difficult to administer in that the BNGs may be distant from one another rather than centrally located. Moreover, in this decentralized deployments, the service provider may require more BNGs than in centralized deployments in that BNGs may be deployed in less populated areas that may not fully utilize these BNGs, therefore wasting capacity that may otherwise have been used in a centralized deployment. Requiring more BNGs may therefore increase costs, leading many service providers to opt for a centralized BNG deployment.

In this centralized BNG deployment, the BNGs are located in a central office and are logically connected to each customer network via one or more customer virtual local area networks (C-VLANs) or one or more C-VLANs and one or more multicast-VLANs (M-VLANs). While the centralized BNG deployment models may reduce costs, these centralized models may suffer from difficulties in accurately monitoring and profiling bandwidth with respect to each customer network. Moreover, in the centralized BNG model involving only C-VLANs, bandwidth may not be utilized efficiently as multicast traffic, such as IPTV traffic, is replicated for each C-VLAN at the centralized BNG rather than further downstream, as would be the case in centralized BNG deployments that utilize M-VLANs in addition to C-VLANs to connect with customer networks. As a result of not being able to accurately profile customer bandwidth utilization, service providers may not be able to police or otherwise enforce the service profile in the centralized BNG models with the result that customers may either receive more or less bandwidth than that provided for in their associated service profile.

To illustrate, consider the example of FIG. 1 in which BNGs 18A-18N ("BNGs 18") are deployed according to the centralized deployment model within service provider network 16. BNGs 18, in this example, are located or otherwise positioned in core network 16, remote from aggregation networks 14. In the example of FIG. 1, aggregation networks 14 each includes network aggregation devices (NADs) 20A-20N ("NADs 20"). NADs 20 each represent a device that aggregates customer traffic for delivery upstream to one of BNGs 18 and demultiplexes downstream traffic from BNGs 18 for delivery to each of their associated ones of customer networks 12. NADs 20 may include a cable modem termination system (CMTS) in a coaxial-based network or a digital subscriber line access multiplexer (DSLAM) in a telephone or copper line network. NADs 20 may backhaul this aggregated upstream traffic by tunneling the aggregated traffic via a service VLAN (S-VLAN) established over a label switched path (LSP). In the example of FIG. 1, only a single S-VLAN 22 is shown as a tunnel or tube, although each of NADs 20 may terminate a similar S-VLAN 22 between each of NADs 20 and an associated one of centralized BNGs 18. As shown in the example of FIG. 1, one side of each of S-VLANs 22 is terminated at a respective one of NADs 20 while another side is terminated at one of BNGs 18, where each of BNGs 18 may terminate all of S-VLANs 22 for any given one of aggregation networks 14.

Also, the service provider provisions a C-VLAN for each of customer networks 12, where these C-VLANs are shown for customer networks 12A-12L as dashed lines denoted 24A-24L. While not shown with respect to each of remaining customer networks 12M-12Z, the service provider also provisions a C-VLAN for each of these customer networks 12M-12Z, as well. One side of each C-VLAN 24A-24L ("C-VLANs 24") is terminated at the customer access equipment, such as the DSL modem or cable modem mentioned above but not shown in the example of FIG. 1 for ease of illustration purposes, while the other side of each of C-VLANs 24 is terminated at one of BNGs 18 (commonly, the same one of BNGs 18 as BNGs 18 typically terminate all customer connections associated with a given NAD 20).

The service provider may also provision service provider network 11 to provide a multicast VLAN (M-VLAN) for delivery of multicast traffic, such as streaming video traffic and IPTV traffic, from BNGs 18 to one or more of customer networks 12. In the example of FIG. 1, an M-VLAN is shown as a dashed-dotted line 26 that is terminated at multiple downstream ends by customer networks 12A and 12L and at the originating end by one of BNGs 18. S-VLAN 22 may backhaul both C-VLANs 24 and M-VLAN 26, effectively aggregating both traffic associated with C-VLANs 24 and M-VLAN 26. While shown as only spanning a single aggregation network 14, some M-VLANs may span multiple aggregation networks, so long as these multiple aggregation networks are managed by the same one of BNGs 18. In addition, M-VLAN 26 may span multiple NADs 20 within the same one of aggregation networks 14, again so long as the same one of BNGs 18 manages those ones of NADs 20. Thus, in typical centralized deployment models, each of BNGs 18 typically terminates all S-VLANs 22 for those NADs 20 included within the same one of aggregation networks 14 to facilitate easy administration and management of M-VLANs 26.

In some centralized BNG deployments, the service provider may only provision C-VLANs 24 for each of customer networks 12 without provisioning M-VLAN 26. However, with the growth of multicast traffic to delivery video services, such as IPTV, use of C-VLANs 24 results in BNGs 18 replicating this multicast traffic and delivering copies of this multicast traffic via each of C-VLANs 24 associated with customer networks 12 subscribed to this multicast traffic when two or more of customer networks 12 have subscribed to watch the same TV channel concurrently. When these customer networks 12 access service provider network 11 via the same one of NADs 20, the copies are delivered via the same S-VLAN 22 to, for example, NAD 20A, wasting bandwidth over this link as a single copy could have been sent via S-VLAN 22 and replicated at this NAD 20A when using M-VLAN 26. The waste in bandwidth is amplified when all of customer networks 12 are subscribed to the same multicast channel, such as during widely watched sporting events, political events or televised crisis. Thus, many service providers provision M-VLANs 26 to alleviate bandwidth concerns over aggregation networks 14 when opting to delivery streaming video services, such as IPTV.

Regardless of whether M-VLANs 26 are provisioned to alleviate these bandwidth concerns, in either C-VLAN-only centralized BNG deployments or in hybrid C-VLAN/M-VLAN centralized deployments, BNGs 18 may be unable to accurately profile subscriber bandwidth utilization. That is, when traffic is transmitted via these hierarchically arranged VLANs, such as when the C-VLAN is tunneled through the S-VLAN in the C-VLAN only model or when both the C-VLAN and the M-VLAN are tunneled through the S-VLAN in the hybrid model, the BNG may be unable to access the C-VLAN traffic due to the aggregation provided by the S-VLAN. In the C-VLAN-only centralized BNG deployment model, BNG 18A, as one example to illustrate this point, receives aggregated traffic via S-VLAN 22 and may not include the functionality to access this aggregated traffic to determine to which one of C-VLANs 24 this traffic is associated. Instead, BNGs 18 may only access the so-called "outer" S-VLAN tag identifying to which one of S-VLANs 22 this traffic corresponds. The SVLAN tag is referred to as the "outer tag" in that it is located closer to the top of the label stack appended to each packet sent from and to each of these customer networks 12. A C-VLAN tag is often referred to as the "inner tag" in that it is positioned below or closer to the packet header in the label stack.

BNGs 18 may, therefore, only know of S-VLANs in this centralized deployment model, thereby potentially preventing BNGs 18 from properly determining to which customer network 12 traffic is destined (when sending traffic downstream to custom networks 12) and from which customer network 12 this traffic originated (when receiving traffic from customer networks 12). Without having this capability to effectively resolve to which customer network 12 this traffic is associated, BNGs 18 may be unable to accurately profile bandwidth utilization by customer networks 12. The inability to accurately profile bandwidth utilization may prevent effective policing of the service profile associated with each of customer networks 12.

In addition, in the hybrid C-VLAN/M-VLAN centralized BNG deployment model, BNGs 18 are unable to accurately determine whether one of customer networks 12 has joined a multicast group (which effectively represents a TV channel or other type of video multicast content), as NADs 20 may manage joins and leaves of multicast group, re-provisioning M-VLAN 26 to reach those of its associated ones of customer networks 12. Without such visibility into M-VLANs 26, BNGs 18 may, again, be unable to accurately profile bandwidth utilization for customer networks 12. This lack of accurate bandwidth profiling may result, as noted above, in effective policing the service profile associated with each of customer networks 12. When effective policing of the service profile is not possible, as in these centralized BNG deployments, service provider network 11 may either provide more bandwidth or less bandwidth to customer networks 12 than that to which the corresponding customers have contracted. Allowing over bandwidth utilization may decrease the number of customers that can be adequately serviced per aggregation network, increasing costs and potentially resulting in latency issues. In not providing sufficient bandwidth, the service provider may experience poor customer satisfaction that reduces customer subscription and renewal rates, impacting profits and service provider reputation.

In accordance with the techniques described in this disclosure, NADs 20, which are intermediately positioned between customer networks 12 and centralized BNGs 18, may profile customer network bandwidth and police and/or shape customer bandwidth utilization in accordance with the service profile. Because intermediately positioned NADs 20 are generally positioned in service provider network 11 prior to aggregation of customer traffic, intermediately positioned NADs 20 may identify to which of customer networks 12 data traffic is associated unlike centrally positioned BNGs 18 that terminate and manage these connections in the form of C-VLANs 24, where upstream aggregation via S-VLANs 22 may prevent accurate bandwidth profiling. Consequently, the techniques may enable service providers to achieve the cost benefits associated with a centralized deployment of customer connection management devices while also potentially providing for the more accurate customer bandwidth profiling (and thereby policing and enforcement of the service profile) of de-centralized or distributed deployments of customer connection management devices, i.e., BNGs 18 in the example of FIG. 1.

As shown in the example of FIG. 1, core network 16 includes an authentication device in the exemplary form of a remote authentication dial-in user subscriber (RADIUS) server 28 ("RADIUS server 28"). RADIUS server 28 may represent a device that implements a RADIUS protocol specified in Request for Comments (RFC) 2865, entitled "Remote Authentication Dial In User Server (RADIUS)," which is hereby incorporated by reference as if set forth in its entirety. While described with respect to RADIUS server 28, the techniques may be implemented with respect to one or more devices that provide authentication, authorization and accounting (AAA) services in accordance with AAA protocols. Other types of AAA protocols include a Diameter protocol or any other AAA protocol.

Upon initially connecting to service provider network 11, one of customer networks 12, such as customer network 12A, issues an authentication message in accordance with, in this example, the RADIUS protocol. Typically, a customer network access device, such as a DSL modem or cable modem, may issue a first RADIUS authentication message authenticating the customer that owns and operates customer network 12A with service provider network 11. This RADIUS authentication message may initiate a point-to-point protocol (PPP) connection or other type of connection used for authentication or any other type of connection or session, which may generally be referred to as an authentication session or, more specifically, a RADIUS protocol session in this example. This initial RADIUS authentication message may be referred to as a "RAIDUS access-request message." RADIUS server 28 may receive this RADIUS access-request message and respond with a RADIUS access-accept message, a RADIUS access-reject message, or a RADIUS access-challenge message depending on the implementation of the RADIUS protocol in service provider network 11.

Often in implementing the RADIUS protocol, the customer access device, e.g., the DSL modem or cable modem, transmits a RADIUS access-request message that includes a username and password associated with the corresponding customer that authenticates this customer to RADIUS server 28. RADIUS server 28 may then parse this username and password from the RADIUS access-request message, authenticating the customer based on the parsed username and password and sending, upon successful authentication, a RADIUS access-accept message. In some instances, the customer access device does not include this username and password, and RADIUS server 28 may respond with a RADIUS access-challenge message, challenging the customer to provide this username and password. Typically, BNGs 18 present this challenge on behalf of RADIUS server 28, acting as a RADIUS proxy in this instance. If RADIUS server 28 cannot authenticate the provided username and password, RADIUS server 28 responds with a RADIUS access-reject message.

Assuming successful authentication, RADIUS server 28 transmits the RADIUS access-accept message described above, which may include a service profile associated with the authenticated customer that owns and operates customer network 12A. NAD 20A may receive this authentication message and determine the service profile associated with customer network 12A based on the received authentication messages. In some instances, NAD 20A may perform what is referred to herein as "RADIUS snooping" to transparently (at least from the perspective of the customer access device of customer network 12A and RADIUS server 28) intercept these messages and snoop (meaning, copy) the service profile from the RADIUS access-accept message. In other instances, NAD 20A may implement a RADIUS proxy whereby NAD 20A emulates the functionality of RADIUS server 28, terminating a RADIUS protocol connection with customer network 12A and establishing a RADIUS protocol session on behalf of customer networks 12A with RADIUS server 28. Both RADIUS snooping and RADIUS proxy are described in more detail below with respect to the examples of FIGS. 2A and 2B.

In any event, NAD 20A may then associate the service profile with the one or more connections between their corresponding customer network 12 and service provider network 11. That is, NAD 20A may associate the service profile with the C-VLAN tag identifying the one of C-VLAN 24 (where a VLAN may generally represent a logical connection) and/or M-VLANs 28 (depending on the form of the centralized BNG deployment) configured for customer network 12A that initiated the RADIUS protocol session. NAD 20A may also associate this service profile with S-VLAN 22 used to backhaul this traffic to its corresponding one of BNGs 18, which is assumed for purposes of illustration to be BNG 18A. In addition, NAD 20A may determine a MAC address associated with the customer access device that initiated the RADIUS protocol session and associate this MAC address with the service profile. NAD 20A may therefore maintain an association between MAC addresses of the customer access devices, C-VLAN tag and/or M-VLAN tag, and S-VLAN tag. In this manner, NAD 20A may associate the service profile with the one or more connections between customer network 12A and service provider network 11.

Using this association, NAD 20A may then apply the service profile to data traffic received via the associated one or more connections, i.e., C-VLANs 24 and/or M-VLANs 28, between customer network 12A and service provider network 11 to enforce the constraints specified in the service profile on delivery of the data traffic sent and received by these customer networks 12. Commonly, NAD 20A instantiates or otherwise configures policers and/or shapers based on the association between the service profile and the connections to enforce the service profile. These policers and/or shapers, given the MAC address, C-VLAN tag and S-VLAN tag may identify all data traffic destined for and received from customer network 12A. These policers and/or shapers may then accurately profile customer data traffic based on the MAC address and various VLAN tag combinations and thereby effectively police and/or shape delivery of customer data traffic in accordance with the associated service profile.

While described above with respect to customer network 12A, BNG 18A and NAD 20A, each of customer networks 12, BNGs 18 and NADs 20 may operate in a substantially similar manner to that described above with respect to customer network 12A, BNG 18A and NAD 20A. In this manner, the techniques may facilitate accurate bandwidth profiling by an intermediately positioned network device in a centralized BNG deployment. Because intermediately positioned NADs 20 is generally positioned in the network prior to aggregation of customer traffic, intermediately positioned NADs 20 may identify to which customer network data traffic is associated unlike centralized BNGs 18 that terminate and manage these connections. Consequently, the techniques may enable service providers to achieve the cost benefits associated with a centralized deployment of BNGs 18 while also potentially providing for the more accurate customer bandwidth profiling (and thereby policing and enforcement of the service profile) of de-centralized or distributed deployments of BNGs.

In addition, while described in this disclosure with respect to NADs 20, the techniques may be implemented by any network device positioned prior to aggregation of customer traffic and delivery of such aggregated customer traffic to BNGs 18. Such devices, while not shown in the example of FIG. 1, may include switches that reside more proximate to customer networks 12 that switch traffic to NADs 20. Moreover, in some large local area networks, a distribution switch may aggregate traffic from a number of different NADs 20 within a given aggregation network and transmit this traffic upstream to BNGs 18. The techniques may be implemented in these distribution switches as well. However, in hybrid C-VLAN/M-VLAN centralized BNG deployment models, implementing the techniques may result in inaccurate bandwidth profiling as an accurate view of which customer networks 12 receive multicast traffic may not be possible, again, given that NADs 20 may replicate such multicast traffic and track customer network 12 subscription to multicast streams. In addition, while described herein with respect to BNGs 18, the techniques may be implemented with respect to network systems that include other types of devices similar in operation to BNGs 18. Device that are similar in operation to BNGs 18 may include so-called "broadband service routers" or "BSRs," and broadband remote access servers (BRASes).

Figure 2A:
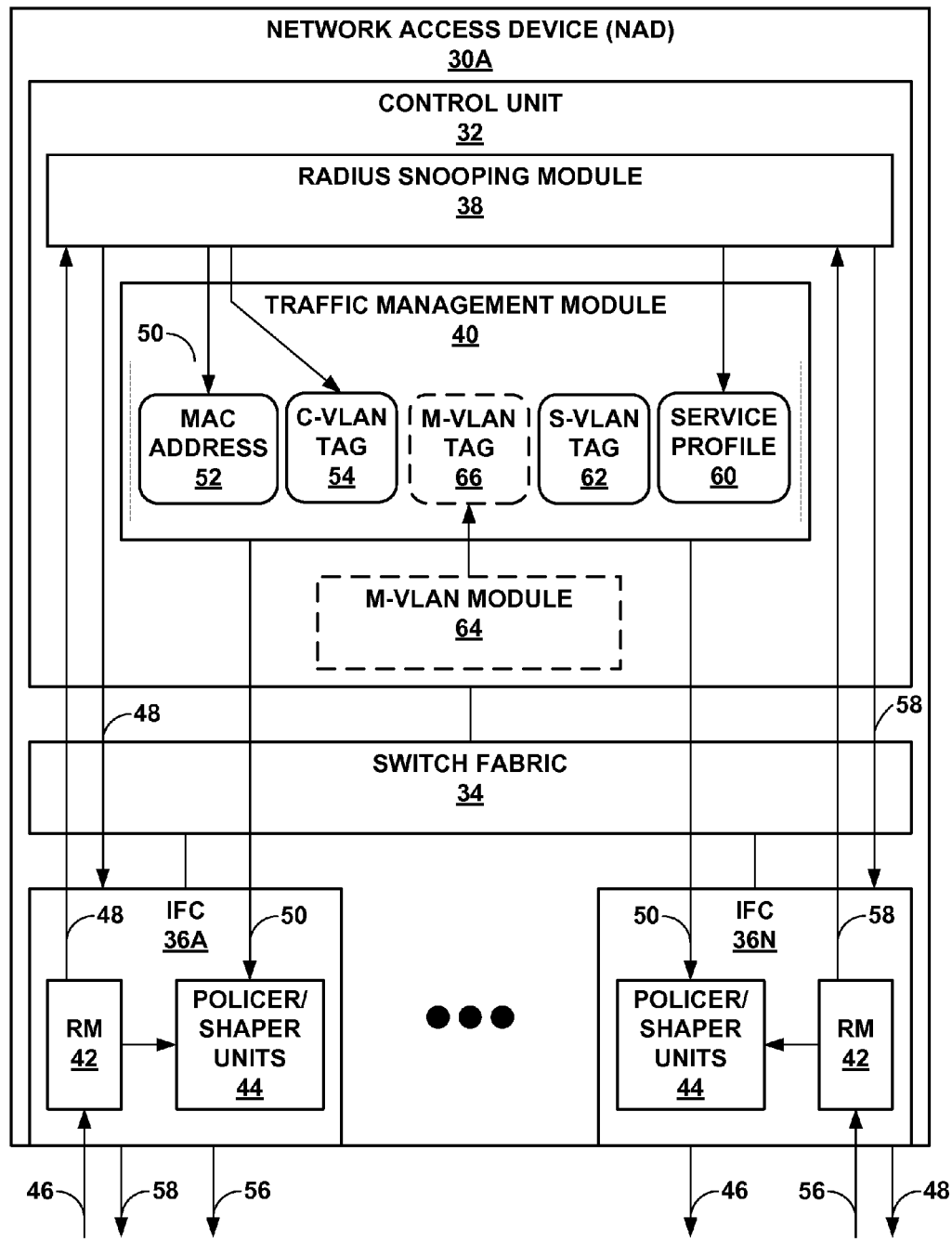
FIGS. 2A and 2B are block diagrams illustrating examples of network access device that implements different aspects of the customer bandwidth profiling techniques described in this disclosure.
Figure 2B:
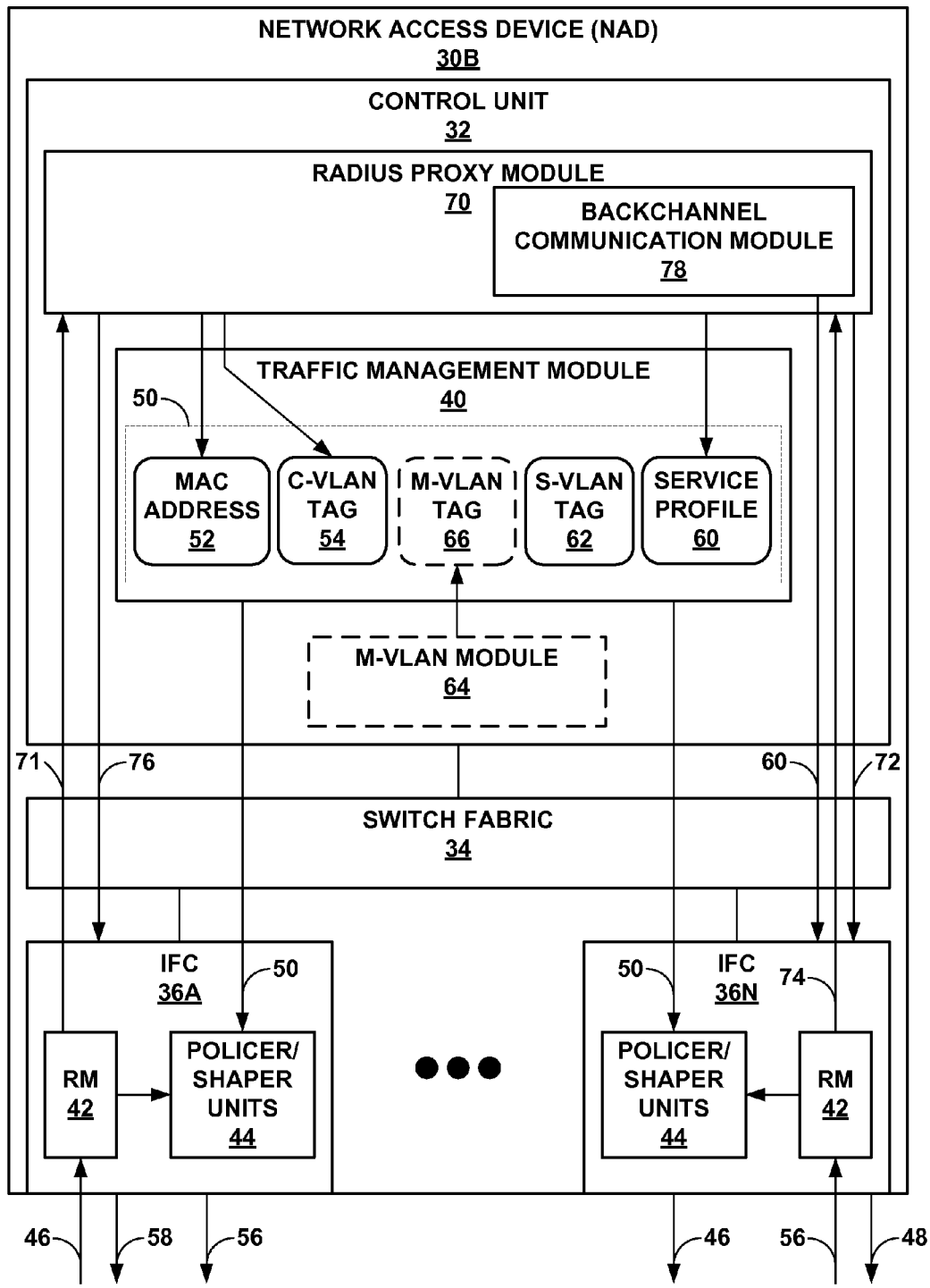

FIGS. 2A and 2B are block diagrams illustrating examples of network access device 30A, 30B that implements different aspects of the customer bandwidth profiling techniques described in this disclosure. Referring first to the example of FIG. 2A, network access device 30A includes a control unit 32, a switch fabric 34, and interface cards (IFCs) 36A-36N ("IFCs 36"). NAD 30A may represent any one of NADs 20, although, for purposes of illustration, NAD 30A is assumed to represent NAD 20A.

Control unit 32 may represent one or more processors (not shown in FIG. 2A) that execute software instructions, such as those used to define a software or computer program, stored to a computer-readable storage medium (again, not shown in FIG. 2A), such as a storage device (e.g., a disk drive, or an optical drive), or memory (such as Flash memory, random access memory or RAM) or any other type of volatile or non-volatile memory, that stores instructions to cause a programmable processor to perform the techniques described herein. In this respect, the computer-readable storage medium may comprise a non-transitory computer-readable medium. Alternatively, control unit 32 may represent dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Switch fabric 34 provides a high-speed interconnect for forwarding incoming data packets to the correct one of IFCs 36 for transmission over a network, such as service provider network 11. IFCs 36 may each represent an interface or port between a communication link and NAD 30 by which NAD 30 sends and receives data packets.

While not shown in the example of FIG. 2A for ease of illustration purposes, NAD 30 may be logically and/or physically segmented into a control plane and a data plane. Typically, the control plane is implemented in total by control unit 32, while the data plane is often implemented by portions of control unit 32 in combination with switch fabric 34 and IFCs 36. The control plane generally provides for the routing or other control over the data plane, configuring within the data plane forwarding information in the case of routing functionality or otherwise maintaining, monitoring and providing an interface by which administrators may interact with the forwarding plane to administer or otherwise manage the forwarding plane. The data plane generally forwards packets, performs bandwidth profiling and policing and/or traffic shaping in accordance with service profiles.

Control unit 32 includes a RADIUS snooping module 38 and a traffic management module 40, both of which may reside within the control plane of NAD 30. RADIUS snooping module 38 may represent a module that performs RADIUS snooping to transparently intercept RADIUS authentication messages consistent with the techniques described in this disclosure. Traffic management module 40 represents a module responsible for managing customer traffic and otherwise ensuring compliance with an associated service profile.

Each of IFCs 36 includes a redirection module (RM) 42 ("RM 42") and one or more policers and/or shaper units 44 ("policer/shaper units 44"). Redirection module 42 represents a module that redirects traffic from customer networks from the data plane to the control plane. Redirection module 42 may be implemented as a filter that is configured to trap packets based on criteria, which in this instance may include criteria identifying packets sent to and from customer networks 12 as RADIUS authentication messages. Once trapped, redirection module 42 may forward these packets to control unit 32 for further consideration by RADIUS snooping module 38. Policers and/or shaper units 44 may represent units that can be configured to police and or shape traffic in accordance with a service profile.

In operation, IFCs 36 may receive traffic 46 in the form of packets and/or messages from customer networks 12. Redirection modules 42 apply their filters to assess whether packets of traffic 46 include the configured criteria identifying these packets as RADIUS authentication messages. If one or more packets are not classified as being RADIUS authentication messages, redirection module 42 may forward these packets to a corresponding one of policer/shaper units 44 that is associated with the packet. If none of policer/shaper units 44 are associated with the packets, IFC 36A may, in some instances, drop the packet or, alternatively forward the packet via switch fabric 34 to one of IFCs 36 associated with the destination address specified in the header of the packet.

If however, one or more packets are classified as being RADIUS authentication messages via application of the filter or classification criteria, redirection modules 42 forward these RADIUS authentication messages to RADIUS snooping module 38. In the example of FIG. 2A, redirection module 42 of IFC 36A is shown to forward RADIUS authentication messages 48 to RADIUS snooping module 38. While not shown in the example of FIG. 2A, redirection modules 42 of remaining IFCs 36B-34N may likewise classify packets of traffic 46 as RADIUS authentication messages 48 and forward these RADIUS authentication messages 48 to RADIUS snooping module 38. RADIUS snooping module 38 may then snoop these RADIUS authentication messages 48 to determine a service profile associated with the one of customer networks 12 that originated RADIUS authentication messages 48.

Typically, however, customer originated RADIUS authentication messages 48 do not normally include a service profile, but may identify a MAC address associated with the customer access devices, as well as, a C-VLAN tag identifying a C-VLAN associated with the one of customer networks 12 that originated RADIUS authentication messages 48. That is, the customer access device may be pre-configured to append a C-VLAN tag to all communications forwarded by this customer access device, meaning that the C-VLAN has been configured between this customer access device and BNGs 18 prior to deployment of the customer access device. For purposes of illustration, it is assumed that customer network 12A originated traffic 48 including a RADIUS authentication message 48.

RADIUS snooping module 38 may snoop or otherwise transparently copy (meaning that the data is copied without modifying RADIUS authentication message 48 in any notable manner) this MAC address and C-VLAN tag, passing this MAC address and C-VLAN tag to traffic management module 40. Traffic management module 40 may, upon receiving the MAC address and C-VLAN tag, determine first whether an association has been stored for this customer network 12A identified by the MAC address and C-VLAN tag pair that associates this MAC address/C-VLAN tag pair with a service profile. If an association has already been defined for this one of customer networks 12, traffic management module 40 does not create an association and disregards (e.g., discards) the received MAC address and C-VLAN tag. If, however, traffic management module 40 does not currently maintain an association for this MAC address and C-VLAN tag, traffic management module 40 creates a new entry in the data structure, such as a table, that stores these associations defining an association 50 that will potentially associate this MAC address and C-VLAN tag with a service profile. Traffic management module 40 then stores this MAC address and C-VLAN tag to this newly created entry as MAC address 52 and C-VLAN tag 54.

After transparently copying or otherwise snooping this RADIUS authentication message 48, RADIUS snooping module 38 forwards this snooped RADIUS authentication message 48 back to the one of IFCs 36A that originally redirected these messages to RADIUS snooping module 38, which in this instance is assumed to be IFC 36A. IFC 36A then switches these RADIUS authentication messages 48 via switch fabric 34 to the one of IFCs 36 that couples NAD 30A to its corresponding one of BNGs 18, i.e., which is assumed to be BNG 18A for purposes of illustration, that terminates S-VLAN 22 between NAD 30A and BNG 18A. Assuming that connectivity to BNG 18A occurs via S-VLAN 22 through IFC 36N for purposes of illustration, IFC 36A switches these RADIUS authentication messages 48 via switch fabric 34 to IFC 36N. IFC 36N then appends an S-VLAN tag identifying these RADIUS authentication messages 48 as corresponding to S-VLAN 22 and forwards RADIUS authentication messages 48 via S-VLAN 22 to BNG 18A that terminates this S-VLAN 22. BNG 18A receives this RADIUS authentication message 48, removes the appended outer S-VLAN tag and the appended inner C-VLAN tag from this RADIUS authentication message 48 and forwards RADIUS authentication messages 48 to RADIUS server 28.

Assuming RADIUS authentication messages 48 each includes a username and password and that RADIUS server 28 successfully authenticates the corresponding customers based on the included username and password, RADIUS server 28 responds with RADIUS authentication messages 58 granting customer network 12A access to service provider network 11. Typically, RADIUS authentication message 58 originated by RADIUS server 28 are referred to, as noted above, as a RADIUS access-accept message and thus may be referred to RADIUS access-accept message 58. RADIUS access-accept message 58 may include a service profile associated with the MAC address specified in RADIUS authentication message 48 (which may also be referred to as RADIUS access-request message 48) to which the RADIUS access-accept message 58 is in response.

RADIUS server 28 may then transmit RADIUS access-accept message 58 downstream to customer network 12A, where corresponding BNG 18A may snoop the service profile from RADIUS access-accept message 58 to determine to which services an associated customer has subscribed and thereby provide these services to the customer. BNGs 18 may utilize this service profile to facilitate administration and customer management as well. Alternatively, BNG 18A may interface with RADIUS server 28 to retrieve this service profile. In any event, BNG 18A appends a C-VLAN tag identifying C-VLAN 24A associated with customer network 12A, as identified by the destination MAC address specified in RADIUS access-accept message 58 and also appends an S-VLAN tag identifying S-VLAN 22 associated with C-VLAN 24A. BNG 18A forwards RADIUS access-accept message 58 downstream via S-VLAN 22 to NAD 20A.

Assuming again that NAD 30A shown in the example of FIG. 2A represents NAD 20A of FIG. 1, NAD 30A receives RADIUS access accept message 58 via S-VLAN 22 from BNG 18A. In particular, given the assumption noted above that IFC 36N terminates this S-VLAN 22, IFC 36A receives traffic 56 via this S-VLAN 22 that includes RADIUS access-accept message 58 in response to RADIUS authentication message 48 sent via IFC 36N. IFC 36N removes the appended S-VLAN tag from received traffic 56, whereupon redirection module 42 may determine whether any of the packets, such as RADIUS access-accept message 58, forming traffic 56 represent RADIUS authentication messages similar to the operation of redirection module 42 of IFC 36A described above. Redirection module 42 of IFC 36N may determine that RADIUS access-accept message 58 represents an RADIUS authentication messages through application of the filter or classification criteria and forwards RADIUS access-accept message 58 to RADIUS snooping module 38.

Upon receiving RADIUS access-accept message 58, RADIUS snooping module 38 may copy the service profile specified by RADIUS access-accept message 58 and the destination MAC address. RADIUS snooping module 38 may then forward this service profile along with the associated destination MAC addresses to traffic management module 40, which may store this service profile 60 to corresponding association 50 identified by the destination MAC address. This destination MAC address should, assuming RADIUS access-accept message 58 were not corrupted during delivery, match the source MAC address copied from RADIUS authentication message 48 and passed by RADIUS snooping module 38 to traffic management module 40 to create the entry in the table defining association 50.

In some instances, redirection modules 42 of IFCs 36 may only be configured to redirect RADIUS access-accept messages, such as RADIUS access-accept message 58, which may be identified by a code specified in the header of these messages. The above incorporated RFC 2865 indicates that RADIUS access-accept messages are identified by a code with a value of "2" in the header of these messages. RADIUS snooping module 38 may, in this instance, snoop these messages to determine the C-VLAN tag appended to each of these messages and a destination MAC address and service profile specified by each of these messages 58. In this way, RADIUS snooping module 38 may only potentially snoop one, rather than two or more, RADIUS authentication messages, which may alleviate configuration and administration of NAD 30A (and NAD 30B shown in the example of FIG. 2B for similar reasons).

Traffic management module 40, upon receiving this service profile 60 and updating association 50, may then determine an S-VLAN tag identifying S-VLAN 22 and update this association 50 with the determined S-VLAN tag by storing this S-VLAN tag to the table entry, which is shown in the example of FIG. 2A as S-VLAN tag 62. Traffic management module 40 may determine this S-VLAN tag 62 by parsing configuration information (which is not shown in the example of FIG. 2A for ease of illustration purposes) statically configuring NAD 30A to terminate S-VLAN 22. Alternatively, traffic management module 40 may query a configuration manager module (which again is not shown in the example of FIG. 2A for ease of illustration purposes) to determine this S-VLAN tag 62 in instances where S-VLAN 22 may be dynamically configured or, in other instances, where such configuration information is not accessible by traffic management modules 40.

In C-VLAN-only centralized BNG deployments, traffic management module 40 interfaces with the data plane to configure one or more policer/shaper units 44 of the one of IFCs 36 associated with the C-VLAN identified by C-VLAN tag 54 to police and/or shape upstream data traffic 46 having appended to this traffic 46 a C-VLAN tag that is the same as C-VLAN tag 54 specified by association 50 in accordance with associated service profile 60. In the downstream direction, traffic management module 40 interfaces with one or more policer/shaper units 44 of the one of IFCs 36 associated with the S-VLAN identified by S-VLAN tag 62 and the C-VLAN identified by C-VLAN tag 54 to police and/or shape downstream data traffic 56 having appended to this traffic 56 an S-VLAN tag/C-VLAN tag pair that is the same as S-VLAN tag 62/C-VLAN tag 54 pair specified by association 50 in accordance with associated service profile 60.

Meanwhile, RADIUS snooping module 38 may forward transparently intercepted RADIUS access-accept message 58 back to IFC 36N, which proceeds to forward these messages 58 via switch fabric 34 to the one of IFCs 36 associated with appended C-VLAN tag 54, i.e., which is assumed to be IFC 36A in this example. IFC 36A receives this RADIUS access-accept message 58 and forwards this message 58 to the associated one of customer networks 12.

Redirection module 42 of IFC 36A may then receive data traffic 46 from authenticated customer network 12A, but in this instances determines that none of the packets forming upstream traffic 46 represents a RADIUS authentication message. In response to this determination, redirection module 42 forwards these packets to the one of policer/shaper units 44 associated with MAC address 52 specified by these data packets and the C-VLAN tag 54 appended to this traffic 46, which then performs bandwidth profiling so as to enable policing and/or shaping of traffic 46 associated with this MAC address 52/C-VLAN tag 54 combination. Policer/shaper units 44 may police this traffic by dropping packets that exceed bandwidth constraints specified in service profile 60. Policer/shaper units 44 may shape this traffic by delaying bursty traffic so that this traffic does not exceed bandwidth constraints specified in service profile 60. Assuming at least some of this traffic 46 remains after policing and/or shaping, IFC 36A forwards this traffic to, in this example, IFC 36N, which appends S-VLAN tag 62 before sending this traffic 46 to BNG 18A. BNG 18A removes both S-VLAN tag 62 and C-VLAN tag 54 before sending this traffic 46 to its intended destination specified in the header of the packets forming traffic 46.

In the downstream direction, policer/shaper units 44 of IFC 36N perform substantially the same operations to police and/or shape those packets of downstream traffic 56 having appended the S-VLAN tag 62/C-VLAN tag 54 pair. Assuming some of this traffic 56 remains after policing and/or shaping, IFC 36N switches this traffic 56 via switch fabric 34 to IFC 36A, which forwards this traffic 56 to the one of customer networks 12 that terminates the C-VLAN identified by C-VLAN tag 54.

In the hybrid C-VLAN/M-VLAN centralized BNG deployment module, control unit 32 includes an M-VLAN module 64 that maintains an association between an S-VLAN established between NAD 30A and, in this example, BNG 18A for the purpose of communicating multicast traffic, such as IPTV traffic, and C-VLANs. Commonly, customer networks 12 issue multicast join requests in accordance with an Internet Group Management Protocol (IGMP) requesting to join a so-called "multicast group." This multicast group typically provides streaming video that may be analogous to content delivered via a broadcast television channel. Customer networks 12 may also issue IGMP leave requests to leave such multicast groups (although this is not a requirement of IGMP). M-VLAN module 64 may receive these requests (as redirected by redirection modules 42 of IFCs 36) and associate different C-VLANs over which these join requests were received with an S-VLAN used to delivery each of the streaming video channels. S-VLANs used for this multicast purpose may be referred to as M-VLANs and the term M-VLAN may generally refer to the combination of these S-VLANs and associated C-VLANs. M-VLAN module 64 may configure the data plane to replicate traffic received over each of these S-VLANs used for delivering multicast streams for delivery to its associated C-VLANs. The S-VLAN tag identifying these S-VLANs used for delivering multicast streams or traffic may be referred to as an M-VLAN tag.

M-VLAN module 64 may therefore report these M-VLAN tags and associated C-VLAN tags to traffic management module 40 in response to each IGMP join and leave request.

In the example of FIG. 2A, M-VLAN module 64 may report M-VLAN tag 66 in response to receiving an IGMP join request from customer network 12A to join the multicast group associated with M-VLAN tag 66. M-VLAN module 64 may also report C-VLAN tag 54 appended to the IGMP join request received from customer network 12A to traffic management module 40. Traffic management module 40 may then retrieve association 50 storing C-VLAN tag 54 and update association 50 to store M-VLAN tag 66. Traffic management module 40 may then interface with policer/shaper units 44 of IFCs 36A and 36N to begin policing all traffic 46 and 56 having either C-VLAN tag 54 or M-VLAN tag 66 appended to packets forming traffic 46 and 56. Policer/shaping units 44 of IFCs 36A and 36N and NAD 30A may generally operate in all other respects similar to that described above with respect to the C-VLAN-only centralized BNG deployment model.

Referring to the example of FIG. 2B, NAD 30B may be substantially similar to NAD 30B except that NAD 30B includes a RADIUS proxy module 70 rather than a RADIUS snooping module 38. RADIUS proxy module 70 differs from RADIUS snooping module 38 in that RADIUS proxy module 70 terminates RADIUS protocol sessions between its associated one of customer networks 12 and NAD 30B and initiates RADIUS protocol sessions on behalf of its associated ones of customer networks 12 with RADIUS server 28.

In other words, customer access devices may be configured to transmit RADIUS authentication messages 69 to NAD 30B rather than to RADIUS server 28, where RADIUS proxy module 71 responds to these RADIUS authentication messages 71 as if it is RADIUS server 28. In response to receiving, for example, a RADIUS authentication message 71 from customer 12A, RADIUS proxy module 70 initiates a connection on behalf of customer network 12A with RADIUS server 28 generates a different RADIUS authentication message 72 based on received message 71 and issues message 72 via this separate connection. RADIUS authentication message 72 therefore specifies this RADIUS proxy module 70 as the source MAC address but requests authentication for customer network 12A. Assuming RADIUS server 28 responds with a RADIUS authentication message 74 granting access, i.e., a RADIUS access-accept message 74 in this example, RADIUS proxy module 70 receives this message 74 and generates a separate RADIUS access-accept message 76 based on this message 74. RADIUS proxy module 70 then sends message 76 to customer network 12A. More information regarding RADIUS proxies and their general operation may be found in the above incorporated RFC 2865, although such RADIUS proxies are generally described in a networking context that does not adhere to a centralized BNG deployment model.

In effect, RADIUS proxy module 70 provides another way by which NAD 30B may discover service profile 30, as RADIUS proxy module 70 terminates all sessions over which RADIUS traffic is sent and therefore is ensured to receive RADIUS authentication messages that specify service profile 60. While RADIUS proxy module 70 provides an effective way by which to determine service profile 60, by initiating a RADIUS protocol session with RADIUS server 28 directly, BNGs 18 may be unaware of this session (as it appears from the perspective of BNGs 18 to originate from NAD 30B rather than a customer access device). Consequently, BNGs 18 may not snoop this session to discover service profile 60, which these BNGs 18 may utilize in providing one or more services. That is, BNGs 18 may utilize service profiles in determining to which service an associated customer has subscribed. Without these service profiles, BNGs 18 may fail to actually delivery any services despite that the customer has been authorized by RADIUS server 28 to access the subscribed-to services provided by service provider network 11.

To overcome this issue, RADIUS proxy module 70 may include a backchannel communication module 78. Backchannel communication module 78 may represent a module that initiates, maintains or otherwise provides a session over which service profile 60 may be communicated back to the corresponding one of BNGs 18 that terminates the C-VLAN identified by the C-VLAN tag appended to the RADIUS authentication messages 71 received from customer network 12A, as one example. This session may be referred to as a "backchannel" in that this channel is used to communicate data back to the corresponding one of BNGs 18. Upon determining service profile 60, backchannel communication module 78 may initiate this backchannel and transmit this service profile 60 back to, as one example, BNG 18A. In this manner, NAD 30B may implement a RADIUS proxy to discover service profile 60 so that policers/shaping units 44 of IFCs 36 may accurately profile bandwidth and thereby effectively police and/or shape traffic in accordance with these discovered service profiles.

Figure 3A:
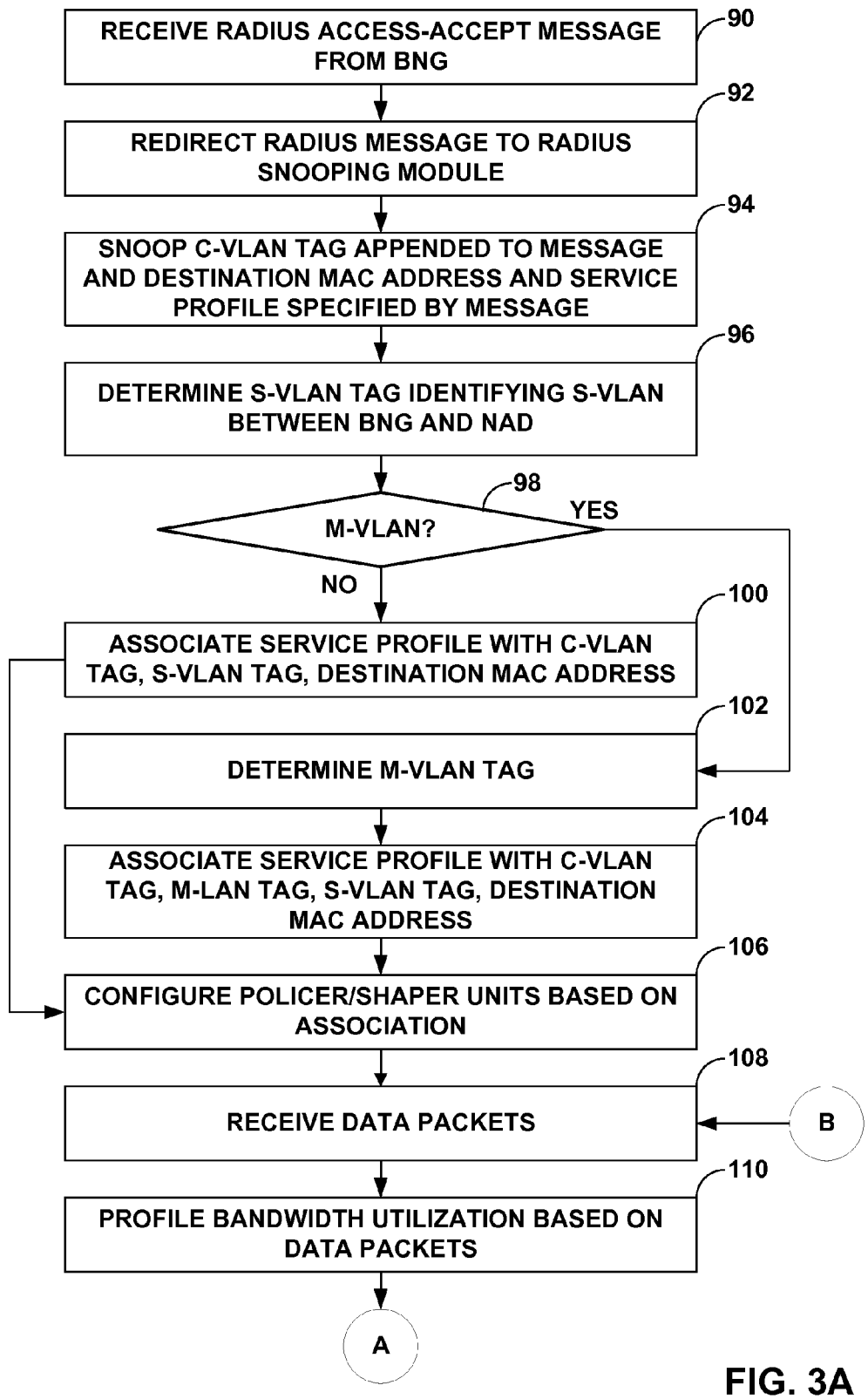
FIGS. 3A and 3B are flowcharts illustrating example operation of network access devices in implementing RADIUS snooping aspects of the bandwidth profiling techniques described in this disclosures.
Figure 3B:
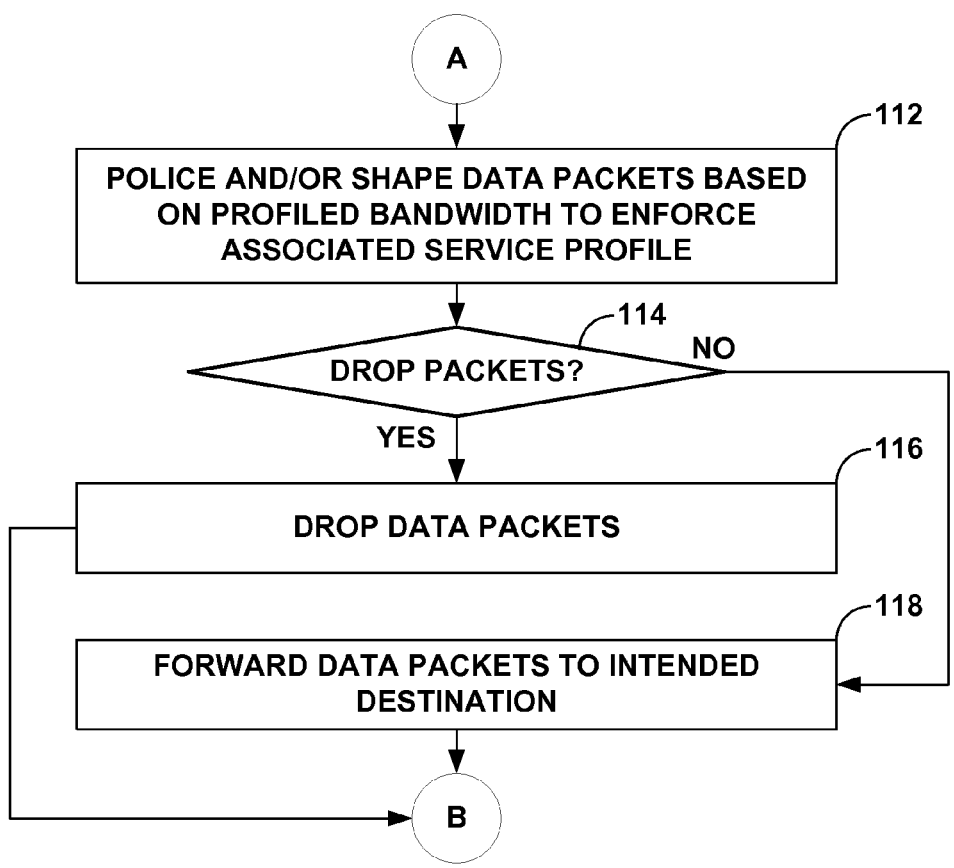

FIGS. 3A and 3B are flowcharts illustrating example operation of network access devices, such as network access devices 30A shown in the example of FIG. 2A, in implementing RADIUS snooping aspects of the bandwidth profiling techniques described in this disclosures. While described with respect to NAD 30A, the techniques may be implemented by any network device positioned prior to traffic aggregation and delivery of such aggregated traffic upstream to BNGs or similar devices that is capable of implementing the RADIUS snooping aspects of the techniques described in this disclosure.

As noted above, NAD 30A may receive a RADIUS access-accept message 58 from, for example, BNG 18A (90), assuming NAD 30A represents NAD 20A in the example of FIG. 1. More specifically, assuming IFC 36N terminates S-VLAN 22, IFC 36N of NAD 30A receives this message 58, whereupon redirection module 42 of IFC 36N redirects this message 58 to RADIUS snooping module 38 in the manner described above (92). RADIUS snooping module 38 may then snoop C-VLAN tag 54 appended to this RADIUS access-accept message 58 and destination MAC address 52 and service profile 60 specified by this RADIUS access-accept message 58 (94). RADIUS snooping module 38 forwards this snooped C-VLAN tag 54, destination MAC address 52 and service profile 60 to traffic management module 40. In response to receiving this snooped C-VLAN tag 54, destination MAC address 52 and service profile 60, traffic management module 40 determines S-VLAN tag 62 in, for example, one of the ways described above (96).

Traffic management module 40, when M-VLANs are employed, may be configured to also determine whether this customer is receiving traffic via an M-VLAN (98). M-VLAN module 64 may inform traffic management module 40 or otherwise report when various C-VLANs are associated or disassociated with any given M-VLAN. Traffic management module 40 may receive from M-VLAN module 64 an M-VLAN tag 66 (as well as a C-VLAN tag 54 allowing traffic management module 40 to determine which association 50 to update with M-VLAN tag 66). Upon receiving such a report or otherwise being informed by M-VLAN module 64, traffic management module 40 may determine that M-VLANs are being employed to delivery multicast traffic to customer network 12A, for example ("YES" 98).

When M-VLANs are not employed or if customer network 12A is not currently receiving any multicast traffic via an M-VLAN ("NO" 98), traffic management module 40 may associate service profile 50 with C-VLAN tag 54, S-VLAN tag 62 and destination MAC address 52 (100). However, when M-VLANs are employed and customer network 12A is receiving multicast traffic, M-VLAN module 64 reports M-VLAN tag 66 to traffic management module 40 allowing traffic management module 40 to determine M-VLAN tag 66 (102). Traffic management module 40 therefore associates service profile 60 with C-VLAN tag 54, M-VLAN tag 66, S-VLAN tag 62 and destination MAC address 52 (104). Regardless of whether M-VLANs are employed or not or whether customer network 12A is currently receiving multicast traffic via an M-VLAN, traffic management module 40 configures the appropriate ones of policer/shaper units 44 in the manner described above based on this association, which is denoted as association 50 in the example of FIG. 2A (106). Once the appropriate ones of policer/shaper units 44 are configured, these policer/shaper units 44 may be able to accurately identify all customer traffic by way of C-VLAN tag 54, S-VLAN tag 62, destination MAC address 52 and potentially M-VLAN tag 66.

As noted above, it is assumed that IFCs 36A and 36N receive upstream and downstream traffic associated with customer network 12A and therefore that policer/shaper units 44 of IFCs 36A, 36N represent the appropriate ones of policer/shaper units configured to police and/or shape this upstream and downstream traffic, respectively. This assumption however should not limit the techniques described in this disclosure as more than these policer/shaper units 44 may be configured to police and/or shape customer traffic associated with exemplary customer network 12A depending on the various configurations of the VLANs deployed throughout service provider network 11.

In any event, IFCs 36A and 36N may receive data packets forming upstream traffic 46 and downstream traffic 56. As these data packets do not conform to the RADIUS protocol, redirection modules 42 of these IFCs 36A, 36N may direct these packets to policer/shaper units 44 of these IFCs 36A, 36N. Policer/shaper units 44 of IFCs 36A, 36N may then profile bandwidth utilization based on these data packets, where such profiling may involve determining an amount of bandwidth utilized over a configured or dynamically changing period of time (110). Typically, such bandwidth profiles are expressed in terms of a number of bits per second and correspond to service agreements that specify a single bandwidth upper limit and a single bandwidth lower limit for all traffic associated with a collection of services. For example, the customer that owns and operates customer network 12A may subscribe to a gold service guaranteeing a maximum sustained upper bandwidth limit of 50 megabits per second (Mbps) and a lower bandwidth limit of 2 Mbps for a collection of two or more of a voice service, data service and IPTV service, where delivery of such services is often referred to as a multi-play package. In some instances, separate bandwidth upper and lower limits may be specified for each of the services or for a sub-set of two or more services.

Continuing on to the example of FIG. 3B following the circle denoted "A" from the bottom of FIG. 3A, configured policer/shaper units 44 of IFCs 36A, 36N may police and/or shape these data packets in the manner described above based on the profiled bandwidth to enforce these bandwidth limits defined by associated service profile 60 (112). When policing traffic, policer/shaper units 44 may determine to drop these data packets when the profiled bandwidth utilization exceeds the upper bandwidth limit (114). Assuming the profiled bandwidth utilization exceeds the upper bandwidth limit and policer/shaper units 44 determine to drop this traffic ("YES" 114), policer/shaper units 44 drop the data packets (116). Assuming the bandwidth profile does not exceed this upper limit and therefore that policer/shaper units 44 do not determine to drop these data packets ("NO" 114), policer/shaper units 44 forward the data packets to their intended destinations (118).

IFCs 36A, 36N may continue to receive packets, profile bandwidth utilization and enforce the bandwidth limits of service profile 60 in the manner described above (referring back to 108 shown the example of FIG. 3A through 118 shown in the example of FIG. 3B). Although not shown in the examples of FIGS. 3A, 3B, M-VLAN module 64 may, when M-VLANs are employed, continue to report M-VLAN tags, such as M-VLAN tags 66, to traffic management module 40 in response to IGMP join and leave requests received from customer networks 12. Traffic management module 40 may update the associated associations 50 with these M-VLAN tags 66 in the manner described above and automatically (meaning, without any user or administrative input) reconfigure the appropriate ones of policer/shaper units 44 to identify multicast traffic associated with the M-VLAN tags and thereby profile bandwidth utilized by this multicast traffic. Thus, while not shown in the example of FIG. 3A for ease of illustration purposes, the techniques should not be limited in this respect.

Figure 4A:
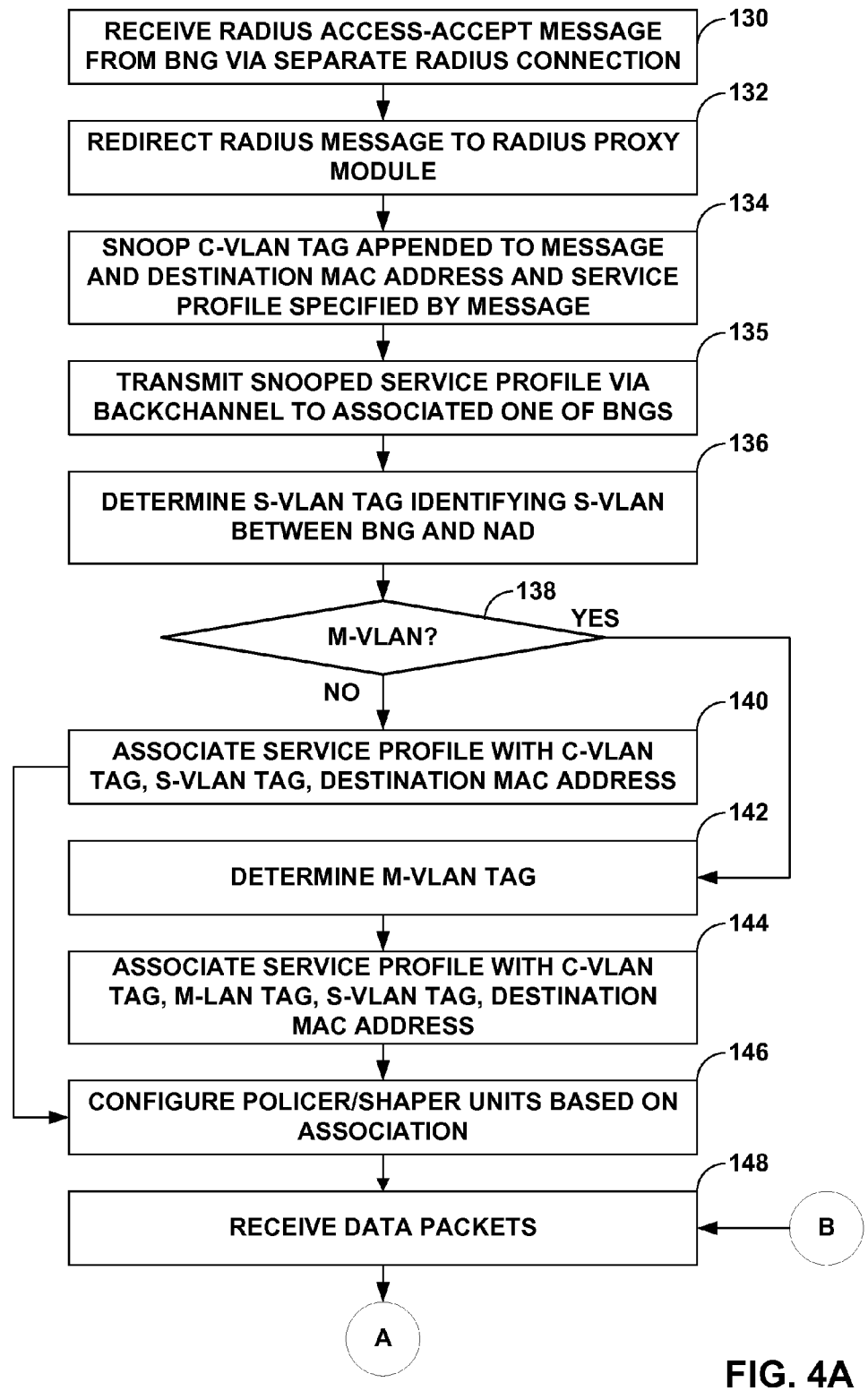
FIGS. 4A and 4B are flowcharts illustrating example operation of network access devices in implementing RADIUS proxy aspects of the bandwidth profiling techniques described in this disclosure.
Figure 4B:
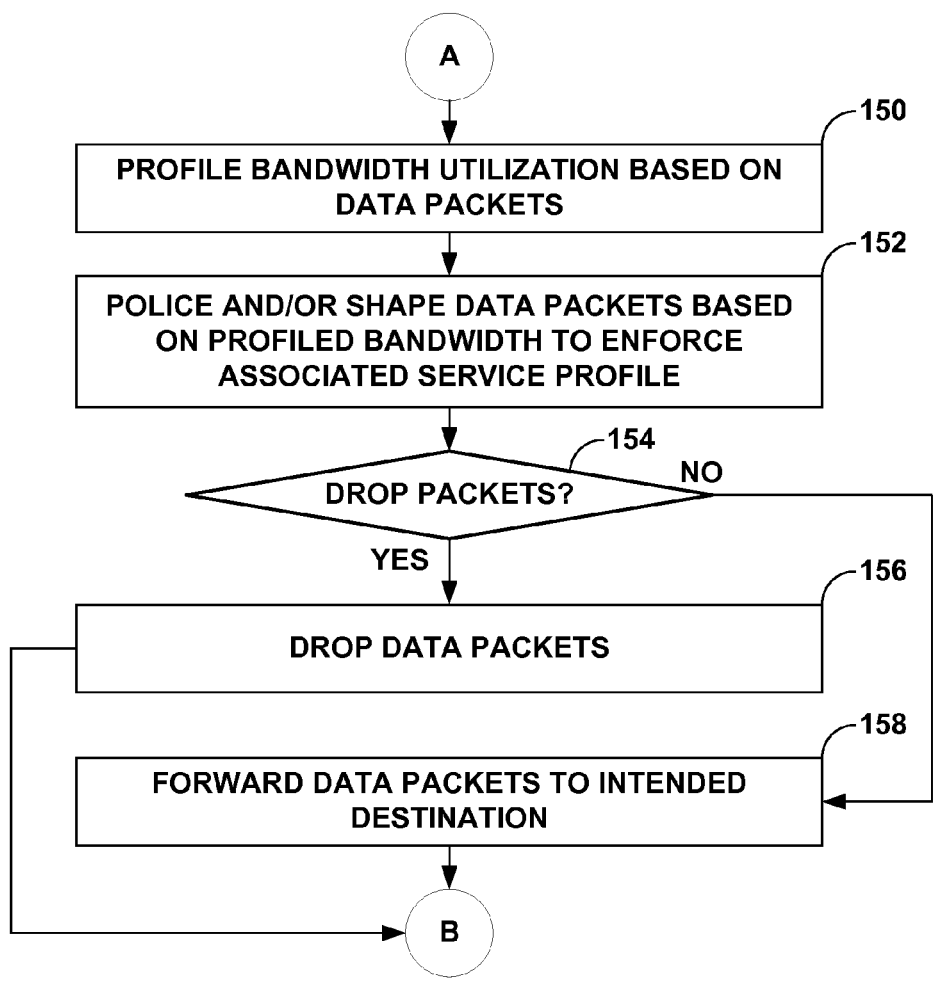

FIGS. 4A and 4B are flowcharts illustrating example operation of network access devices, such as network access devices 30B shown in the example of FIG. 2B, in implementing RADIUS proxy aspects of the bandwidth profiling techniques described in this disclosures. As noted above, the RADIUS proxy aspects of the techniques are similar in operation to the RADIUS snooping aspects of the techniques accept in terms of defining association 50 and configuring policer/shaping units 44. The differences between these two different aspects of the techniques lie in how the RADIUS protocol sessions are maintained, where in RADIUS snooping the RADIUS protocol sessions are established between customer networks 12 and RADIUS server 28 (or possibly an associated one of BNGs 18 when acting as a RADIUS proxy). In contrast, when implementing a RADIUS proxy, one RADIUS protocol session is established between customer network 12 and NAD 30B and a second RADIUS protocol session is established between NAD 30B and RADIUS server 28 potentially bypassing BNGs 18. In bypassing BNGs 18, NAD 30B may be required to transmit service profile 60 via a backchannel to the associated one of BNGs 18 in the manner described above.

As noted above, NAD 30B may receive a RADIUS access-accept message 74 via the second RADIUS protocol session noted above from, for example, BNG 18A (130), assuming NAD 30B represents NAD 20A in the example of FIG. 1. More specifically, assuming IFC 36N terminates S-VLAN 22, IFC 36N of NAD 30B receives this message 74, whereupon redirection module 42 of IFC 36N redirects this message 74 to RADIUS proxy module 70 in the manner described above (132). RADIUS proxy module 70 may then parse C-VLAN tag 54 appended to this RADIUS access-accept message 74 and destination MAC address 52 and service profile 60 specified by this RADIUS access-accept message 74 (134). RADIUS proxy module 70 then generates another RADIUS access-accept message 76, issuing this RADIUS access-accept message 76 via the first RADIUS protocol session discussed above. RADIUS proxy module 70 may also invoke backchannel communication module 78 to transmit service profile 60 back to the associated one of BNGs 18 in the manner described above (135).

RADIUS proxy module 70 also forwards this snooped C-VLAN tag 54, destination MAC address 52 and service profile 60 to traffic management module 40. In response to receiving this snooped C-VLAN tag 54, destination MAC address 52 and service profile 60, traffic management module 40 determines S-VLAN tag 62 in, for example, one of the ways described above (136).

Traffic management module 40, when M-VLANs are employed, may be configured to also determine whether this customer is receiving traffic via an M-VLAN (138). M-VLAN module 64 may inform traffic management module 40 or otherwise report when various C-VLANs are associated or disassociated with any given M-VLAN. Traffic management module 40 may receive from M-VLAN module 64 an M-VLAN tag 66 (as well as a C-VLAN tag 54 allowing traffic management module 40 to determine which association 50 to update with M-VLAN tag 66). Upon receiving such a report or otherwise being informed by M-VLAN module 64, traffic management module 40 may determine that M-VLANs are being employed to delivery multicast traffic to customer network 12A, for example ("YES" 138).

When M-VLANs are not employed or if customer network 12A is not currently receiving any multicast traffic via an M-VLAN ("NO" 138), traffic management module 40 may associate service profile 50 with C-VLAN tag 54, S-VLAN tag 62 and destination MAC address 52 (140). However, when M-VLANs are employed and customer network 12A is receiving multicast traffic, M-VLAN module 64 reports M-VLAN tag 66 to traffic management module 40 allowing traffic management module 40 to determine M-VLAN tag 66 (142). Traffic management module 40 therefore associates service profile 60 with C-VLAN tag 54, M-VLAN tag 66, S-VLAN tag 62 and destination MAC address 52 (144). Regardless of whether M-VLANs are employed or not or whether customer network 12A is currently receiving multicast traffic via an M-VLAN, traffic management module 40 configures the appropriate ones of policer/shaper units 44 in the manner described above based on this association, which is denoted as association 50 in the example of FIG. 2B (146). Once the appropriate ones of policer/shaper units 44 are configured, these policer/shaper units 44 may be able to accurately identify all customer traffic by way of C-VLAN tag 54, S-VLAN tag 62, destination MAC address 52 and potentially M-VLAN tag 66.

As noted above, it is assumed that IFCs 36A and 36N receive upstream and downstream traffic associated with customer network 12A and therefore that policer/shaper units 44 of IFCs 36A, 36N represent the appropriate ones of policer/shaper units configured to police and/or shape this upstream and downstream traffic, respectively. This assumption however should not limit the techniques described in this disclosure as more than these policer/shaper units 44 may be configured to police and/or shape customer traffic associated with exemplary customer network 12A depending on the various configurations of the VLANs deployed throughout service provider network 11.

In any event, IFCs 36A and 36N may receive data packets forming upstream traffic 46 and downstream traffic 56 (148). As these data packets do not conform to the RADIUS protocol, redirection modules 42 of these IFCs 36A, 36N may direct these packets to policer/shaper units 44 of these IFCs 36A, 36N. Continuing on to the example of FIG. 4B following the circle denoted "A" from the bottom of FIG. 4A, policer/shaper units 44 of IFCs 36A, 36N may then profile bandwidth utilization based on these data packets, where such profiling may involve determining an amount of bandwidth utilized over a configured or dynamically changing period of time (150).

Configured policer/shaper units 44 of IFCs 36A, 36N may police and/or shape these data packets in the manner described above based on the profiled bandwidth to enforce these bandwidth limits defined by associated service profile 60 (152). When policing traffic, policer/shaper units 44 may determine to drop these data packets when the profiled bandwidth utilization exceeds the upper bandwidth limit (154). Assuming the profiled bandwidth utilization exceeds the upper bandwidth limit and policer/shaper units 44 determine to drop this traffic ("YES" 154), policer/shaper units 44 drop the data packets (156). Assuming the bandwidth profile does not exceed this upper limit and therefore that policer/shaper units 44 do not determine to drop these data packets ("NO" 154), policer/shaper units 44 forward the data packets to their intended destinations (158).

IFCs 36A, 36N may continue to receive packets, profile bandwidth utilization and enforce the bandwidth limits of service profile 60 in the manner described above (referring back to 108 shown the example of FIG. 3A through 118 shown in the example of FIG. 3B). Although not shown in the examples of FIGS. 3A, 3B, M-VLAN module 64 may, when M-VLANs are employed, continue to report M-VLAN tags, such as M-VLAN tags 66, to traffic management module 40 in response to IGMP join and leave requests received from customer networks 12. Traffic management module 40 may update the associated associations 50 with these M-VLAN tags 66 in the manner described above and automatically (meaning, without any user or administrative input) reconfigure the appropriate ones of policer/shaper units 44 to identify multicast traffic associated with the M-VLAN tags and thereby profile bandwidth utilized by this multicast traffic. Thus, while not shown in the example of FIG. 3B for ease of illustration purposes, the techniques should not be limited in this respect.

Various aspects of the techniques have been described. These and other aspects are within the scope of the following claims.

The invention claimed is:

1. A method comprising:
by a network device, determining a service profile from one or more authentication messages received by the network device that include the service profile, wherein the network device is intermediately positioned in a service provider network between a customer network and a centralized network device that provides a hierarchical arrangement of virtual local area networks (VLANs) over which traffic to and from the customer network for one or more services is delivered, wherein the hierarchical arrangement of VLANs includes a customer VLAN (C-VLAN) that is tunneled through a service VLAN (S-VLAN),
wherein the C-VLAN is terminated at the customer network and the centralized network device that provides the hierarchical arrangement of VLANs,
wherein the intermediately positioned network device is connected to the centralized network device via the S-VLAN in which the intermediately positioned network device tunnels the C-VLAN through the S-VLAN with a plurality of other C-VLAN in a manner that aggregates the C-VLAN with the plurality of other C-VLANs;

associating, with the intermediately positioned network device, the service profile with a first VLAN tag for the C-VLAN and a second VLAN tag for the S-VLAN in the hierarchical arrangement of VLANs used for delivering the traffic to and from the customer network and the service provider network, wherein the service profile defines constraints on delivery of the traffic associated with the one or more services sent to and received by the customer network; and applying the service profile with the intermediately positioned network device to the traffic received via the associated hierarchical arrangement of VLANs when the traffic is tagged with the first VLAN tag and the second VLAN tag to enforce the constraints on the delivery of the traffic received via the associated hierarchical arrangement of VLANs.

2. The method of claim 1, further comprising:

configuring one or more of a policer unit and a shaper unit located in a data plane of the intermediately positioned network device based on the association of the service profile with the hierarchical arrangement of VLANs such that all of the traffic transported via the hierarchical arrangement of VLANs are sent to the one or more of the configured policer unit and the shaper unit; and profiling bandwidth utilization with the configured one or more of the policer unit and the shaper unit based on the traffic received via the associated hierarchical arrangement of VLANs, wherein applying the service profile comprises applying the service profile with the one or more of the policer unit and the shaper unit to the traffic based on a comparison of the profiled bandwidth utilization to the service profile to enforce the constraints on the delivery of the traffic transported via the hierarchical arrangement of VLANs between the customer network and the service provider network.

3. The method of claim 1, wherein the service provider network does not employ any multicast virtual local area networks (M-VLANs) to deliver traffic to the customer network, wherein the method further comprises:

determining a C-VLAN tag identifying the C-VLAN based on the received authentication messages, wherein the first VLAN tag comprises the C-VLAN tag; and determining an S-VLAN tag identifying the S-VLAN, wherein the second VLAN tag comprises the S-VLAN tag, and wherein associating the service profile with the hierarchical arrangement of VLANs comprises associating the service profile with the C-VLAN tag and the S-VLAN tag.

4. The method of claim 3, further comprising:

determining a media access control (MAC) address associated with the customer network based on the received authentication messages, wherein the MAC address is specified by at least one of the authentication messages; and associating the service profile with the determined MAC address.

5. The method of claim 1, wherein the hierarchical arrangement of VLANs also comprises a multicast virtual local area network (M-VLAN) that is also tunneled through the S-VLAN, wherein the M-VLAN is terminated at the customer network in addition to one or more other customer networks and the centralized network device and used for delivering multicast traffic downstream from the centralized network device to the customer network and the one or more other customer networks, wherein the method further comprises:

determining a C-VLAN tag identifying the C-VLAN based on the received authentication messages, wherein the first VLAN tag comprises the C-VLAN tag;

determining an S-VLAN tag identifying the S-VLAN, wherein the second VLAN tag comprises the S-VLAN tag; and determining an M-VLAN tag identifying the M-VLAN, and wherein associating the service profile with the hierarchical arrangement of VLANs comprises associating the service profile with the C-VLAN tag, the S-VLAN tag and the M-VLAN tag.

6. The method of claim 5, further comprising:

determining a media access control (MAC) address associated with the customer network based on the received authentication messages, wherein the MAC address is specified by at least one of the authentication messages; and associating the service profile with the determined MAC address.

7. The method of claim 1, further comprising transparently intercepting the one or more authentication messages with the intermediately positioned network device, wherein determining the service profile comprises copying the service profile associated with the customer network without altering the received authentication messages, and wherein the method further comprises forwarding the originally received one or more authentication messages to either of the customer network or an authentication server.

8. The method of claim 1, further comprising:

establishing a first authentication protocol session initiated by the customer network such that the intermediately positioned network device terminates one end of an authentication protocol session;

receiving a first one of the one or more authentication messages via the first authentication protocol session from the customer network;

establishing a second authentication protocol session different from the first authentication protocol session with an authentication server in response to receiving the first one of the authentication messages;

generating an authentication message based on the first one of the one or more authentication messages;

transmitting the authentication message generated based on the first one of the one or more authentication messages via the second authentication protocol session to authenticate the customer network with the authentication server;

receiving a second one of the one or more of the authentication messages via the second authentication protocol session authenticating the customer network;

generating an authentication message based on the second one of the one or more authentication messages; and transmitting the authentication message generated based on the second one of the one or more authentication messages via the first authentication protocol session to grant the customer network access to the service provider network.

9. The method of claim 8, wherein determining the service profile comprises determining a service profile associated with the customer network based on the received second one of the one or more authentication messages.

10. The method of claim 1, wherein the one or more authentication messages conform to a remote access dial in user service (RADIUS) authentication protocol.

11. The method of claim 1,
wherein the intermediately positioned network device comprises one of a digital subscriber line multiplexer (DSLAM) or a cable modem termination system (CMTS), and
wherein the centralized network device comprises one of a broadband network gateway (BNG), a broadband service router (BSR) or a broadband remote access server (BRAS).

12. A network device intermediately positioned in a service provider network between a customer network and a centralized network device that provides a hierarchical arrangement of virtual local area networks (VLANs) over which traffic to and from the customer network for one or more services is delivered, the network device comprising:
a control unit that determines a service profile from one or more authentication messages received by the network device that include the service profile,
wherein the hierarchical arrangement of VLANs includes a customer VLAN (C-VLAN) that is tunneled through a service VLAN (S-VLAN),
wherein the C-VLAN is terminated at the customer network and the centralized network device that provides the hierarchical arrangement of VLANs,
wherein the intermediately positioned network device is connected to the centralized network device via the S-VLAN in which the intermediately positioned network device tunnels the C-VLAN through the S-VLAN with a plurality of other C-VLAN in a manner that aggregates the C-VLAN with the plurality of other C-VLANs, and
wherein the control unit associates the service profile with a first VLAN tag for the C-VLAN and a second VLAN tag for the S-VLAN in the hierarchical arrangement of VLANs used for delivering the traffic to and from the customer network and the service provider network, wherein the service profile defines constraints on delivery of the traffic associated with the one or more services sent to and received by the customer network; and
at least one interface card that applies the service profile with the intermediately positioned network device to the traffic received via the associated hierarchical arrangement of VLANs when the traffic is tagged with the first VLAN tag and the second VLAN tag to enforce the constraints on the delivery of the traffic received via the associated hierarchical arrangement of VLANs.

13. The network device of claim 12,
wherein the at least one interface card includes one or more of a policer unit and a shaper unit and resides in a data plane of the network device,
wherein the control unit further configures the one or more of the policer unit and the shaper unit based on the association of the service profile with the hierarchical arrangement of VLANs such that all of the traffic transported via the hierarchical arrangement of VLANs are sent to the one or more of the configured policer unit and the shaper unit, and
wherein the one or more of the policer unit and the shaper unit profile bandwidth utilization based on the traffic received via the associated hierarchical arrangement of VLANs and apply the service profile to the traffic based on a comparison of the profiled bandwidth utilization and the service profile to enforce the constraints on the delivery of the traffic transported via the hierarchical arrangement of VLANs between the customer network and the service provider network.

14. The network device of claim 12,
wherein the service provider network does not employ any multicast virtual local area networks (M-VLANs) to deliver data traffic to the customer network, and
wherein the control unit further determines a C-VLAN tag identifying the C-VLAN based on the received authentication messages, wherein the first VLAN tag comprises the C-VLAN tag, and determines an S-VLAN tag identifying the S-VLAN, wherein the second VLAN tag comprises the S-VLAN tag, and associates the service profile with the C-VLAN tag and the S-VLAN tag.

15. The network device of claim 14, wherein the control unit further determines a media access control (MAC) address associated with the customer network based on the received authentication messages, wherein the MAC address is specified by at least one of the authentication messages and associates the service profile with the determined MAC address.

16. The network device of claim 12,
wherein the hierarchical arrangement of VLANs also comprises a multicast virtual local area network (M-VLAN) that is also tunneled through the S-VLAN,
wherein the M-VLAN is terminated at the customer network in addition to one or more other customer networks and the centralized network device and used for delivering multicast traffic downstream from the centralized network device to the customer network and the one or more other customer networks,
wherein the control unit further determines a C-VLAN tag identifying the C-VLAN based on the received authentication messages, wherein the first VLAN tag comprises the C-VLAN tag, determines an S-VLAN tag identifying the S-VLAN, determines an M-VLAN tag identifying the M-VLAN, wherein the second VLAN tag comprises the M-VLAN tag, and associates the service profile with the C-VLAN tag, the S-VLAN tag and the M-VLAN tag.

17. The network device of claim 16, wherein the control unit further determines a media access control (MAC) address associated with the customer network based on the received authentication messages, wherein the MAC address is specified by at least one of the authentication messages and associates the service profile with the determined MAC address.

18. The network device of claim 12,
wherein the control unit transparently intercepts the one or more authentication messages with the intermediately positioned network device, and copies the service profile associated with the customer network without altering the received authentication messages, and
wherein the at least one interface card further forwards the originally received one or more authentication messages to either of the customer network or an authentication server.

19. The network device of claim 12,
wherein the at least one interface card further establishes a first authentication protocol session initiated by the customer network such that the intermediately positioned network device terminates one end of an authentication protocol session, receives a first one of the one or more authentication messages via the first authentication protocol session from the customer network and establishes a second authentication protocol session different from the first authentication protocol session with an authentication server in response to receiving the first one of the authentication messages, wherein the control unit generates an authentication message based on the first one of the one or more authentication messages, wherein the at least one interface card transmits the authentication message generated based on the first one of the one or more authentication messages via the second authentication protocol session to authenticate the customer network with the authentication server and receives a second one of the one or more of the authentication messages via the second authentication protocol session authenticating the customer network, wherein the control unit generates an authentication message based on the second one of the one or more authentication messages, and wherein the at least one interface card transmits the authentication message generated based on the second one of the one or more authentication messages via the first authentication protocol session to grant the customer network access to the service provider network.

20. The network device of claim 19, wherein the control unit determines a service profile associated with the customer network based on the received second one of the one or more authentication messages.

21. The network device of claim 12, wherein the one or more authentication messages conform to a remote access dial in user service (RADIUS) authentication protocol.

22. The network device of claim 12,
wherein the network device comprises one of a digital subscriber line multiplexer (DSLAM) or a cable modem termination system (CMTS), and
wherein the centralized network device comprises one of a broadband network gateway (BNG), a broadband service router (BSR) or a broadband remote access server (BRAS).

23. A non-transitory computer-readable medium comprising instructions that, when executed, cause one or more processors of a network device intermediately positioned in a service provider network between a customer network and a centralized network device that provides a hierarchical arrangement of virtual local area networks (VLANs) in the service provider network to:
determine a service profile from one or more authentication messages received by the network device that include the service profile, wherein the hierarchical arrangement of VLANs includes a customer VLAN (C-VLAN) that is tunneled through a service VLAN (S-VLAN),
wherein the C-VLAN is terminated at the customer network and the centralized network device that provides the hierarchical arrangement of VLANs,
wherein the intermediately positioned network device is connected to the centralized network device via the S-VLAN in which the intermediately positioned network device tunnels the C-VLAN through the S-VLAN with a plurality of other C-VLAN in a manner that aggregates the C-VLAN with the plurality of other C-VLANs;
associate the service profile with a first VLAN tag for the C-VLAN and a second VLAN tag for the S-VLAN in the hierarchical arrangement of VLANs used for delivering the traffic to and from the customer network and the service provider network, wherein the service profile defines constraints on delivery of the traffic associated with the one or more services sent to and received by the customer network; and
apply the service profile with the intermediately positioned network device to the traffic received via the associated hierarchical arrangement of VLANs when the traffic is tagged with the first VLAN tag and the second VLAN tag to enforce the constraints on the delivery of the traffic received via the associated hierarchical arrangement of VLANs.

24. The non-transitory computer-readable medium of claim 23, further comprising instructions that, when executed cause the one or more processors to:
configure one or more of a policer unit and a shaper unit located in a data plane of the intermediately positioned network device based on the association of the service profile with the hierarchical arrangement of VLANs such that all of the traffic transported via the hierarchical arrangement of VLANs are sent to the one or more of the configured policer unit and the shaper unit; and
profile bandwidth utilization with the configured one or more of the policer unit and the shaper unit based on the traffic received via the associated hierarchical arrangement of VLANs,
apply the service profile with the one or more of the policer unit and the shaper unit to the traffic based on a comparison of the profiled bandwidth utilization to the service profile to enforce the constraints on the delivery of the traffic transported via the hierarchical arrangement of VLANs between the customer network and the service provider network.

25. The non-transitory computer-readable medium of claim 23,
wherein the service provider network does not employ any multicast virtual local area networks (M-VLANs) to deliver traffic to the customer network,
wherein the non-transitory computer-readable medium further comprises instructions that, when executed cause the one or more processors to:
determine a C-VLAN tag identifying the C-VLAN based on the received authentication messages, wherein the first VLAN tag comprises the C-VLAN tag;
determine an S-VLAN tag identifying the S-VLAN, wherein the second VLAN tag comprises the S-VLAN tag; and
associate the service profile with the C-VLAN tag and the S-VLAN tag.

26. The non-transitory computer-readable medium of claim 25, further comprising instructions that, when executed cause the one or more processors to:
determine a media access control (MAC) address associated with the customer network based on the received authentication messages, wherein the MAC address is specified by at least one of the authentication messages; and
associate the service profile with the determined MAC address.

27. The non-transitory computer-readable medium of claim 23,
wherein the hierarchical arrangement of VLANs also comprises a multicast virtual local area network (M-VLAN) that is also tunneled through the S-VLAN,
wherein the M-VLAN is terminated at the customer network in addition to one or more other customer networks and the centralized network device and used for delivering multicast traffic downstream from the centralized network device to the customer network and the one or more other customer networks, wherein the non-transitory computer-readable medium further comprises instructions that, when executed cause the one or more processors to:

determine a C-VLAN tag identifying the C-VLAN based on the received authentication messages, wherein the first VLAN tag comprises the C-VLAN tag;

determine an S-VLAN tag identifying the S-VLAN, wherein the second VLAN tag comprises the S-VLAN tag;

determine an M-VLAN tag identifying the M-VLAN; and associate the service profile with the C-VLAN tag, the S-VLAN tag and the M-VLAN tag.

28. The non-transitory computer-readable medium of claim 27, further comprising instructions that, when executed cause the one or more processors to:

determine a media access control (MAC) address associated with the customer network based on the received authentication messages, wherein the MAC address is specified by at least one of the authentication messages; and associate the service profile with the determined MAC address.

29. The non-transitory computer-readable medium of claim 23, further comprising instructions that, when executed cause the one or more processors to:

transparently intercept the one or more authentication messages with the intermediately positioned network device;

copy the service profile associated with the customer network without altering the received authentication messages; and forward the originally received one or more authentication messages to either of the customer network or an authentication server.

30. The non-transitory computer-readable medium of claim 23, further comprising instructions that, when executed cause the one or more processors to:

establish a first authentication protocol session initiated by the customer network such that the intermediately positioned network device terminates one end of an authentication protocol session;

receive a first one of the one or more authentication messages via the first authentication protocol session from the customer network;

establish a second authentication protocol session different from the first authentication protocol session with an authentication server in response to receiving the first one of the authentication messages;

generate an authentication message based on the first one of the one or more authentication messages;

transmit the authentication message generated based on the first one of the one or more authentication messages via the second authentication protocol session to authenticate the customer network with the authentication server;

receive a second one of the one or more of the authentication messages via the second authentication protocol session authenticating the customer network;

generate an authentication message based on the second one of the one or more authentication messages; and transmit the authentication message generated based on the second one of the one or more authentication messages via the first authentication protocol session to grant the customer network access to the service provider network.

31. The non-transitory computer-readable medium of claim 30, further comprising instructions that, when executed cause the one or more processors to determine a service profile associated with the customer network based on the received second one of the one or more authentication messages.

32. The non-transitory computer-readable medium of claim 23, wherein the one or more authentication messages conform to a remote access dial in user service (RADIUS) authentication protocol.

33. The non-transitory computer-readable medium of claim 23, wherein the intermediately positioned network device comprises one of a digital subscriber line multiplexer (DSLAM) or a cable modem termination system (CMTS), and wherein the centralized network device comprises one of a broadband network gateway (BNG), a broadband service router (BSR) or a broadband remote access server (BRAS).

34. A network system comprising:

a customer network; and a service provider network that includes:

a centralized network device that manages customer network connections; and a network device intermediately positioned between the customer network and the centralized network device, wherein the intermediately positioned network device comprises:

a control unit that determines a service profile from one or more authentication messages received by the intermediately positioned network device, wherein the hierarchical arrangement of VLANs includes a customer VLAN (C-VLAN) that is tunneled through a service VLAN (S-VLAN), wherein the C-VLAN is terminated at the customer network and the centralized network device that provides the hierarchical arrangement of VLANs, wherein the intermediately positioned network device is connected to the centralized network device via the S-VLAN in which the intermediately positioned network device tunnels the C-VLAN through the S-VLAN with a plurality of other C-VLAN in a manner that aggregates the C-VLAN with the plurality of other C-VLANs, and wherein the control unit associates the service profile with a first VLAN tag for the C-VLAN and a second VLAN tag for the S-VLAN in the hierarchical arrangement of VLANs used for delivering the traffic to and from the customer network and the service provider network, wherein the service profile defines constraints on delivery of the traffic associated with the one or more services sent to and received by the customer network; and at least one interface card that applies the service profile with the intermediately positioned network device to the traffic received via the associated hierarchical arrangement of VLANs when the traffic is tagged with the first VLAN tag and the second VLAN tag to enforce the constraints on the delivery of the traffic received via the associated hierarchical arrangement of VLANs.

* * * * *